(12) United States Patent
Furukawa

(10) Patent No.: US 7,929,413 B2
(45) Date of Patent: Apr. 19, 2011

(54) TRANSMISSION SYSTEM, TRANSMISSION METHOD, TRANSMITTER, RECEIVER, DECODING METHOD, AND DECODER

(75) Inventor: Hiroshi Furukawa, Fukuoka (JP)

(73) Assignee: Kyushu University, National University Corporation, Fukuoka-shi, Fukuoka (JP)

(*) Notice: Subject to any disclaimer, the term of this patent is extended or adjusted under 35 U.S.C. 154(b) by 0 days.

(21) Appl. No.: 12/304,378

(22) PCT Filed: Jun. 12, 2007

(86) PCT No.: PCT/JP2007/061772
§ 371 (c)(1),
(2), (4) Date: Aug. 24, 2009

(87) PCT Pub. No.: WO2007/145188
PCT Pub. Date: Dec. 21, 2007

(65) Prior Publication Data
US 2010/0067365 A1    Mar. 18, 2010

(30) Foreign Application Priority Data
Jun. 14, 2006 (JP) .................. 2006-165249

(51) Int. Cl.
H04J 11/00 (2006.01)
H04B 7/00 (2006.01)
(52) U.S. Cl. .................. 370/208; 370/330; 370/342

(58) Field of Classification Search .................. None
See application file for complete search history.

(56) References Cited

U.S. PATENT DOCUMENTS

| | | | | |
|---|---|---|---|---|
| 5,442,625 A | * | 8/1995 | Gitlin et al. | 370/342 |
| 5,555,268 A | * | 9/1996 | Fattouche et al. | 375/141 |
| 5,856,971 A | * | 1/1999 | Gitlin et al. | 370/335 |
| 6,192,068 B1 | * | 2/2001 | Fattouche et al. | 375/130 |
| 6,320,897 B1 | * | 11/2001 | Fattouche et al. | 375/130 |
| 6,629,667 B2 | * | 10/2003 | Tramontina | 242/593 |

* cited by examiner

*Primary Examiner* — Chi H Pham
*Assistant Examiner* — Soon-Dong D Hyun
(74) *Attorney, Agent, or Firm* — Rankin Hill & Clark LLP

(57) ABSTRACT

A transmission system capable of obtaining an effect of orthogonality among time block codes and an effect of path diversity on a distorted channel is provided. In the transmission system including: a transmitter device transmitting an information signal S[n] multiplied by a code, the code being a time block code constituted by a plurality of time series symbols, the transmitter device multiplying the information signal by a plurality of the time block codes, respectively, multiplexing multiplication results on a time axis and transmitting multiplexed signals; and a receiver device including a reception filter, if an impulse response matrix of a channel is a matrix H, a characteristic of the reception filter is set to be represented by a complex conjugate transpose matrix $H^H$ to the matrix H and each of the time block codes is set by an eigen code $E\_I[n]$ represented by an eigen vector of a matrix $H^H H$ representing a coupled system in which the channel is coupled to the reception filter.

13 Claims, 25 Drawing Sheets

TRANSMISSION SYSTEM, TRANSMISSION METHOD, TRANSMITTER, RECEIVER, DECODING METHOD, AND DECODER

TECHNICAL FIELD

The present invention relates to a transmission system, a transmission method, a transmitter device, a receiver device and a decoding method. The present invention particularly relates to a transmission system or the like including a transmitter device transmitting an information signal multiplied by a code, the code being a time block code constituted by a plurality of time series symbols, the transmitter device multiplying the information signal by a plurality of the time block codes, respectively, multiplexing multiplication results on a time axis and transmitting multiplexed signals and a receiver device including a reception filter.

BACKGROUND ART

FIG. 23 shows appearance of an ordinary code division multiplexing transmission system. The system will be briefly described below.

Before describing the system, code division multiplexing transmission will be briefly described. Multi code direct sequence spread spectrum modulation (MC-DSSS) is a technique for dividing an information signal to be transmitted into blocks in units of a plurality of bits, spreading the bits in one block by orthogonal spreading codes, respectively, multiplexing the resultant spread sequences on a time axis and transmitting the multiplexed signal. A spreading processing on each bit is also regarded as block coding. Therefore, in the following description, each spreading code in the MC-DSSS will be referred to as "time block code". Further, a modulation technique for multiplying an information signal by a plurality of time block codes, parallel-multiplexing resultant signals and transmitting the parallel-multiplexed signal will be generically referred to as "code division multiplexing modulation" similarly to the MC-DSSS modulation.

Referring to FIG. 23, a code division multiplexing transmission system 100 includes a transmitter 100a and a receiver 100b. A signal transmitted from the transmitter 100a is received by the receiver 100b via a channel 109. An information signal S[n] is modulated by a modulation processing unit 101. A resultant modulated signal x(t) is processed by an up-converter 103, subjected to a radio frequency (high frequency) processing by an RF 105 and transmitted from a transmit antenna 107. The transmitted signal is received by a reception antenna 111 via the channel 109. The received signal is subjected to a low noise amplifier and a filter processing by a LNA&reception filter 113 and processed by a down-converter 115. A received signal r[t] is processed by a demodulation processing unit 117 and a decoded signal S^[n] is obtained.

Meanwhile, in a direct sequence-code division multiple access (DS-CDMA), different user signals are multiplied by a plurality of spreading codes, respectively. Further, a receiver side performs multipath separation on the resultant signals using autocorrelation characteristic of each spreading code exhibiting a sharp peak and maximum-ratio combines the signals, thereby separating the user signals multiplexed on a time axis while obtaining path diversity effect. Orthogonal codes such as Walsh codes are used as the spreading code on a DS-CDMA downlink. Even if orthogonal codes are multiplexed and transmitted from a transmitter side, orthogonality is eliminated on the receiver side due to distortion of the channel. However, downlink signals multiplexed by a plurality of users received by respective terminals are transmitted via the same channel on a downlink. Due to this, the orthogonality among the spreading codes can be reproduced by performing chip level equalization for suppressing the distortion of the channel (Non-Patent Document 1 and Non-Patent Document 2).

FIG. 24 shows a configuration of the modulation processing unit 101 shown in FIG. 23 if OFDM as a conventional technique is applied to the unit 101.

In FIG. 24, the modulation processing unit 101 includes an S/P conversion unit 1011, an MOD_OFDM unit 1013, a cyclic prefix addition unit 1015 and a waveform shaping filter 1017. Each of information signals S[i] obtained by conversion performed by the S/P conversion unit 1011 are multiplied by a modulation code C_i[n] by a multiplication unit 1014a of the MOD_OFDM unit 1013. It is assumed herein that a length of the modulation code C_i[n] is N. Sampling sequences are often arranged in elements of vectors in order of time, respectively to be expressed as a multidimensional vector as follows. For example, (C_i[0], C_i[1], ..., C_i[N−1]) are expressed as an N-order code vector. In the OFDM, sinusoidal waves different in frequency and orthogonal to one another are used as C_i[n]. A summation unit 1014b of the MOD_OFDM unit 1013 calculates a sum to obtain X. The cyclic prefix addition unit 1015 performs a processing for adding a cyclic prefix at a length of G to this X to obtain $X_T$. Insertion of the cyclic prefix means addition of a copy of a suffix G symbol of X[n] to a prefix of X[n] without performing any processing. Further, the waveform shaping filter 1017 performs the filter processing to obtain x(t) Furthermore, it is to be noted that the processing performed by the MOD_OFDM unit 1013 surrounded by a dotted line is realized by P/S-converting an output signal after IFFT in the actual OFDM.

FIG. 25 shows a configuration of the demodulation processing unit 117 shown in FIG. 23 if the OFDM as the conventional technique is applied to the unit 117.

The demodulation processing unit 117 includes an M symbol sampling unit 1171, a cyclic prefix removal unit 1173, a filter 1175 and a DMOD_OFDM unit 1177. M is set to N+G, i.e., M=N+G and the M symbol sampling unit 1171 performs a sampling processing on r(t) to obtain R'. Further, the cyclic prefix removal unit 1173 removes the cyclic prefix inserted on the transmitter side and, therefore, processes R[n] in units of blocks each having a length of N. Thereafter, the filter 1175 makes a phase correction of each sub-carrier of the R using P in the form of a complex matrix of N rows by N columns. The DMOD_OFDM unit 1177, which functions as an inner product unit, performs an inner product operation between obtained R_f and C_i to obtain S^[n]. In this case, when two row vectors A and B equal in number of orders are given, (A, B) represents an inner product operation and $(A, B)=A^H \cdot B$, where $A^H$ represents a complex transposed matrix of the matrix A and is a matrix normally referred to as "complex conjugate transpose matrix of A". In the actual OFDM, the DMOD_OFDM unit 1177 surrounded by a dotted line is realized by using FFT after S/P-converting R_f (n).

The above-stated OFDM modulation has been recently frequently adopted in a broadband wireless communication system. The OFDM modulation is regarded as a type of code division multiplexing modulation using time block codes (sinusoidal codes) orthogonal to one another. During demodulation, the orthogonality among the codes is lost by the distortion of the channel as stated. However, by providing a guard interval (GI), filling up Cyclic Prefix (CP) signals, and receiver side' s extracting intervals without adjacent block interference, the orthogonality among the sinusoidal wave codes is maintained and the adjacent block interference is eliminated even on the distorted channel. If a GI length is sufficiently large due to spread of a delay of the channel, each of the received sinusoidal wave codes after elimination of the GI subjected to DFT has only one frequency component without overlap. During demodulation, only by making phase adjustment of the respective sub-carriers on a frequency axis, it is possible to obtain a function corresponding to distortionless transmission even on a frequency selective channel. Non-Patent Documents 3 and 4 pay an attention to this feature of the OFDM and propose techniques for inserting CP into code division multiplexing modulation using such time block codes such as Walsh codes used in the CDMA and for performing FFT processing on a receiver side to equalize the signals on a frequency axis. According to the Non-Patent Documents 3 and 4, an MMSE index is adopted for setting of an equalization weight, thereby obtaining characteristics equal to or higher than the chip level equalization and RAKE reception described in the Non-Patent Documents 1 and 2.

[Non-Patent Document 1]

I. Ghauri and D. Slock, "Linear receivers for DS-CDMA downlink exploiting orthogonality of spreading sequences", Proc. Asilomar Conference on Signals, Systems and Computers, Vol. 1, pp. 650-654, November 1998.

[Non-Patent Document 2]

K. Hooli, M. Latva-aho and M. Juntti, "Multiple access interference suppression in CDMA with linear chip equalizers in WCDMA downlink receivers," Proc. GLOBECOM 99, Vol. General Conference (Part A), pp. 467-471, December 1999.

[Non-Patent Document 3]

F. Adachi, T. Sato and T. Itagaki, "Performance of multicode DS-CDMA using frequency domain equalization in a frequency selective fading channel", Electronics Letters, vol. 39, No. 2, pp. 239-241, January 2003.

[Non-Patent Document 4]

F. Adachi, K. Takeda and H. Tomeba, "Frequency-Domain Pre-Equalization for Multicode Direct Sequence Spread Spectrum Signal Transmission," IEICE Trans. Comm., Vol. E88-B, No. 7, pp. 3078-3081, July 2005.

DISCLOSURE OF THE INVENTION

Problems to be Solved

The Non-Patent Documents 1 and 2 show the chip level equalization by Zero forcing algorithm and that by MMSE index. However, since the former technique generates noise emphasis if a null point is present in frequency characteristics of the channel, the latter is said to be effective. If degree of the distortion is low and the number of multiplex users is small, path diversity is effective by the RAKE reception. If the degree of the distortion on the channel is conspicuous and the number of multiplexing users is large, equalization is effective. Namely, on the DS-CDMA downlink, there is a tradeoff relation between the path diversity effect and the effect of recovery of the orthogonality by equalization. It is difficult to simultaneously and optimally attain the both effects.

Furthermore, with the OFDM and the techniques of the Non-Patent Documents 3 and 4, it is possible to recover the orthogonality among the time block codes on the distorted channel by the CP, but it is impossible to simultaneously obtain the effect of the recovery of the orthogonality and the effect of the path diversity. In the OFDM shown in FIGS. 20 and 21, since different information signals are transmitted to sub-carriers, respectively, the effect of frequency diversity cannot be obtained and the following problems occur. The insertion of the cyclic prefix on the transmitter side and the removal thereof on the receiver side are performed to reduce the interference between the adjacent code blocks and to maintain the orthogonality among the sub-carriers in the same block. However, the cyclic prefix requires unnecessary transmission energy that is not used in demodulation.

The object of the present invention is, therefore, to provide a transmission system capable of simultaneously obtaining the effect of orthogonality among time block codes on a distorted channel and the effect of path diversity, a receiver device and a transmitter device used in the transmission system and a transmission method. The receiver device, the transmitter device and the transmission method also correspond to a so-called MIMO (Multiple Input Multiple Output) system configuration that is a wireless transmitter and receiver device including a plurality of antennas. It is also an object of the present invention to provide a decoding method and a decoding device for canceling interference adaptable to the transmission system or the like.

Means for Solving the Problems

In one embodiment, a transmission system, comprises a transmitter device transmitting an information signal multiplied by a code, the code being a time block code constituted by a plurality of time series symbols, the transmitter device multiplying the information signal by a plurality of the time block codes, respectively, multiplexing multiplication results on a time axis and transmitting multiplexed signals, and a receiver device including a reception filter, wherein if an impulse response matrix of a channel is a matrix H, a characteristic of the reception filter is set to be represented by a complex conjugate transpose matrix $H^H$ to the matrix H and each of the time block codes is set by an eigen code represented by an eigen vector of a matrix $H^H H$ representing a coupled system in which the channel is coupled to the reception filter, the receiver device includes a received modulation block buffer recording a received modulation block signal; and a decoded block buffer recording a decoding result of each received modulation block signals, and a processor to perform a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block, a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block, and a third step of repeating the second step by a desired number of times, is executed as a decoding processing.

In one embodiment, if the eigen vector is $E_k$ (where k represents a $k^{th}$), an eigen value corresponding to each eigen vector is $\lambda_k$ and constant is $\alpha$, the eigen vector $E_k$ is changed to an eigen vector obtained by multiplying the eigen vector $E_k$ by a square root of a weight coefficient $w_k$ proportional to the $\lambda_k^{-\alpha}$.

In one embodiment, if, in the transmission system, the eigen vector is $E_k$ (where k represents a $k^{th}$), an eigen value corresponding to each eigen vector is $\lambda_k$ and constant is TE, an eigen vector $E_k$ satisfying $1/\lambda_k$>TE is not used in transmission of the information signal.

This is based on the following respects. A code vector having an excessively low eigen value causes extremely high bit error. Due to this, the characteristic of the reception filter is rather improved without using these code vectors.

In one embodiment, each of the time block codes is set, by the eigen code, to a transmitter device used in the transmission system.

In one embodiment, a receiver device used in the transmission system includes the reception filter a characteristic of which is set by the complex conjugate transpose matrix $H^H$.

In one embodiment, a transmission method uses a transmitter device transmitting an information signal multiplied by a code and a receiver device including a reception filter, wherein if an impulse response matrix of a channel is a matrix H, then a characteristic of the reception filter is set to be represented by a complex conjugate transpose matrix $H^H$ to the matrix H, a matrix $H^H H$ representing a coupled system in which the channel is coupled to the reception filter is an Hermitian symmetric matrix and the code is a code corresponding to an eigen vector of the matrix $H^H H$, the receiver device includes a received modulation block buffer recording a received modulation block signal; and a decoded block buffer recording a decoding result of each of received modulation block signals. The method includes a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block, a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block, and a third step of repeating the second step by a desired number of times, is executed as a decoding processing.

In some embodiments, a plurality of modulation blocks may be included in the information signal and a time gap may be set between adjacent modulation blocks based on a distortion of the channel. By doing so, modulation block interference can be lessened by providing time gaps between the modulation blocks.

In one embodiment, a transmission system, comprises a transmitter device transmitting an information signal multiplied by a code, the information signal being transmitted on a channel using a plurality of transmit antennas and received from the channel using a plurality of reception antennas, the code being a time block code constituted by a plurality of time series symbols, the transmitter device multiplying the information signal by a plurality of the time block codes, respectively, multiplexing multiplication results on a time axis and transmitting multiplexed signals, and a receiver device including a reception filter, wherein if an impulse response matrix $H_M$ of the channel is defined by the following formula with an impulse response matrix $H_{ij}$ (where i is to discriminate the transmit antennas from one another and j is to discriminate the reception antennas from one another) in a combination between each of the transmit antennas and each of the reception antennas, a characteristic of the reception filter is set to be represented by a complex conjugate transpose matrix $H_M^H$ to the matrix $H_M$ and each of the time block codes is set by an eigen code represented by an eigen vector of a matrix $H_M^H H_M$ representing a coupled system in which the channel is coupled to the reception filter, and the receiver device includes received modulation block buffer of each of the plurality of reception antenna recording each modulation block received by the plurality of reception antennas in parallel, respectively, and provided to correspond to the reception antennas, respectively, combining means for arranging the modulation blocks in an appropriate order and combining the modulation blocks, and a decoded block buffer recording a decoding result of a combined modulation block combined by the combining means, reception means for, when receiving a new modulation block A_i (where i indicates an antenna number), reading a latest decoding result of a modulation block B_i received just before the modulation block A_i from the decoded block buffer, re-modulating the read latest decoding result and filtering the read latest decoding result to correspond to the channel, thereby obtaining a prefix interference component for each A_i, eliminating the prefix interference component from the modulation block A_i, combining, by the combining means, each A_i from which the prefix interference component is eliminated to generate a combined modulation block, storing a decoding result of decoding the combined modulation block in the decoded block buffer, and setting each of a second latest modulation block among modulation blocks in the received modulation block buffer to correspond to each of the reception antennas as each to-be-re-decoded modulation block, re-decoding means for reading a latest decoding result of a modulation block received just before the each to-be-re-decoded modulation block from the decoded block buffer, re-modulating the read latest decoding result of the each to-be-re-decoded modulation block and filtering the read latest decoding result of the each to-be-redecoded modulation block to correspond to the channel, thereby obtaining a prefix interference component to correspond to the each to-be-re-decoded modulation block, reading a latest decoding result of a modulation block received just after the to-be-re-decoded modulation block from the decoded block buffer, re-modulating the read latest decoding result of the to-be-re-decoded modulation block and filtering the read latest decoding result of the to-be-re-decoded modulation block to correspond to the channel, thereby obtaining a postfix interference component to correspond to the each to-be-re-decoded modulation block, eliminating the prefix interference component and the postfix interference component from the each to-be-re-decoded modulation block, combining, by the combining means, the each to-be-re-decoded modulation block from which the prefix interference component and the postfix interference component are eliminated to generate a combined modulation block, storing a decoding result of decoding the combined modulation block in the decoded block buffer, and setting each modulation block received just before the to-be-re-decoded modulation block in the received modulation block buffer to correspond to each of the reception antennas as a new to-be-re-decoded modulation block, and control means for controlling the re-decoding means to repeatedly perform a processing by a desired number of times.

$$H_M = \begin{pmatrix} \boxed{H_{11}} & \boxed{H_{21}} & \cdots & \boxed{H_{NT1}} \\ \boxed{H_{12}} & \boxed{H_{22}} & \cdots & \boxed{H_{NT2}} \\ \vdots & \vdots & & \vdots \\ \boxed{H_{1NR}} & \boxed{H_{2NR}} & \cdots & \boxed{H_{NTNR}} \end{pmatrix}$$

In one embodiment, a transmitter device used in the transmission system comprises a plurality of transmit antennas, a time block code being set by the eigen code, wherein an information signal is multiplied by the time block code, a multiplication result is allocated to each of the transmit antennas, and resultant signals are transmitted in parallel.

In one embodiment, a receiver device used in the transmission system comprises a plurality of reception antennas and the reception filter having a characteristic of which is set by the complex conjugate transpose matrix $H_M^H$ wherein signals received in parallel by the plurality of antennas are arranged, in an appropriate order and combined.

In one embodiment, to a decoding method is for a transmission system including a transmitter device transmitting an information signal multiplied by a code, the code being a time block code constituted by a plurality of time series symbols, the transmitter device multiplying the information signal by a plurality of the time block codes, respectively, multiplexing multiplication results on a time axis and transmitting multiplexed signals, and a receiver device including a reception filter, wherein if an impulse response matrix of a channel is a matrix H, a characteristic of the reception filter is set to be represented by a complex conjugate transpose matrix $H^H$ to the matrix H and each of the time block codes is set by an eigen code represented by an eigen vector of a matrix $H^H H$ representing a coupled system in which the channel is coupled to the reception filter, the receiver device includes a received modulation block buffer recording a received modulation block signal, and a decoded block buffer recording a decoding result of each of received modulation block signals. The decoding method includes a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block, a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block, and a third step of repeating the second step by a desired number of times.

In one embodiment, a decoding method is for a transmission system including a transmitter device transmitting an information signal multiplied by a code, the code being a time block code constituted by a plurality of time series symbols, the transmitter device multiplying the information signal by a plurality of the time block codes, respectively, multiplexing multiplication results on a time axis and transmitting multiplexed signals and a receiver device receiving a transmitted signal, wherein the receiver device includes a received modulation block buffer recording a received modulation signal and a decoded block buffer recording a decoding result of each of received modulation block signals. The decoding method includes a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block, a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block, and a third step of repeating the second step by a desired number of times.

The prefix interference is assumed as an interference in a certain modulation block from a pre-modulation block transmitted before the modulation block due to the distortion of the channel. The postfix interference is assumed as an interference in a modulation block a from a post-modulation block transmitted after the modulation block a due to the distortion of the channel. It is also assumed that components of the prefix interference and the postfix interference are estimated by re-modulating latest decoding results of the pre-modulation block and the post-modulation block, respectively, and filtering the decoding results to correspond to the channel.

Positioning of such an interference canceller is to function to dispense with the time gap and to improve transmission efficiency. The cancelling method above may be, in other words, a following processing. Namely, it is assumed that an interference received by a certain modulation block a from a pre-modulation block transmitted before the modulation block a due to the distortion of the channel is the prefix interference. It is also assumed that an interference received by the modulation block a from a post-modulation block transmitted after the modulation block a due to the distortion of the channel is the postfix interference. Further, it is assumed that the receiver device includes the received modulation block buffer recording received signals for modulation blocks corresponding to previous MB blocks. In the receiver device, when receiving a new modulation block M_new, the M_new is first stored in the received modulation buffer and a current modulation block A is set as a latest modulation block in the modulation block buffer. Further, the following processings 1 and 2 are performed. The processing 1: a latest decoding result of decoding the pre-modulation block before the current modulation block A is re-modulated and filtered to correspond to the channel, thereby estimating a prefix interference component IA_pre received by the current modulation block A. A latest decoding result of decoding the post-modulation block after the current modulation block A is re-modulated and filtered to correspond to the channel, thereby estimating a postfix interference component IA_post received by the current modulation block A. After eliminating the prefix interference component IA_pre and the postfix interference component IA_post from the received signal of the current modulation block A, the current modulation block A is decoded (and a decoding result of decoding the current modulation block A becomes a latest decoding result of the current modulation block A). The processing 2: a second latest modulation block in the modulation block buffer is set as the current modulation block and the processing (of the processing 1) is performed. The processing 2 may be repeatedly performed until the current modulation block is the last in the buffer.

In one embodiment, a decoder is included in a receiver device in a transmission system including a transmitter device transmitting an information signal multiplied by a code, the code being a time block code constituted by a plurality of time series symbols, the transmitter device multiplying the information signal by a plurality of the time block codes, respectively, multiplexing multiplication results on a time axis and transmitting multiplexed signals, and a receiver device receiving a transmitted signal, wherein the decoder device includes a received modulation block buffer recording a received modulation block signal, and a decoded block buffer recording a decoding result of each of received modulation block signals, wherein the decoder includes a received modulation block buffer recording a received modulation block signal, and a decoded block buffer recording a decoding result of each of received modulation block signals, and a process to perform a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block, a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block, and a third step of repeating the second step by a desired number of times, is executed as a decoding processing.

Here, the decoding methods described above can be regarded as decoder devices.

In one embodiment, one aspect of the subject invention relates to a receiver device in a transmission system including a transmitter device transmitting an information signal multiplied by a code, the information signal being transmitted on a channel using a plurality of transmit antennas and received from the channel using a plurality of reception antennas, the code being a time block code constituted by a plurality of time series symbols, the transmitter device multiplying the information signal by a plurality of the time block codes, respectively, multiplexing multiplication results on a time axis and transmitting multiplexed signals, and a receiver device including a reception filter, wherein if an impulse response matrix HM of the channel is defined by the following formula with an impulse response matrix Hij (where i is to discriminate the transmit antennas from one another and j is to discriminate the reception antennas from one another) in a combination between each of the transmit antennas and each of the reception antennas, a characteristic of the reception filter is set to be represented by a complex conjugate transpose matrix HMH to the matrix HM and each of the time block codes is set by an eigen code represented by an eigen vector of a matrix HMHHM representing a coupled system in which the channel is coupled to the reception filter, and the receiver device includes received modulation block buffer of each of the plurality of reception antenna recording each modulation block received by the plurality of reception antennas in parallel, respectively, and provided to correspond to the reception antennas, respectively, combining means for arranging the modulation blocks in an appropriate order and combining the modulation blocks, and a decoded block buffer recording a decoding result of a combined modulation block combined by the combining means, reception means for, when receiving a new modulation block A_i (where i indicates an antenna number), reading a latest decoding result of a modulation block B_i received just before the modulation block A_i from the decoded block buffer, re-modulating the read latest decoding result and filtering the read latest decoding result to correspond to the channel, thereby obtaining a prefix interference component for each A_i, eliminating the prefix interference component from the modulation block A_i, combining, by the combining means, each A_i from which the prefix interference component is eliminated to generate a combined modulation block, storing a decoding result of decoding the combined modulation block in the decoded block buffer, and setting each of a second latest modulation block among modulation blocks in the received modulation block buffer to correspond to each of the reception antennas as each to-be-re-decoded modulation block, re-decoding means for reading a latest decoding result of a modulation block received just before the each to-be-re-decoded modulation block from the decoded block buffer, re-modulating the read latest decoding result of the each to-be-re-decoded modulation block and filtering the read latest decoding result of the each to-be-re-decoded modulation block to correspond to the channel, thereby obtaining a prefix interference component to correspond to the each to-be-re-decoded modulation block, reading a latest decoding result of a modulation block received just after the to-be-re-decoded modulation block from the decoded block buffer, re-modulating the read latest decoding result of the to-be-re-decoded modulation block and filtering the read latest decoding result of the to-be-re-decoded modulation block to correspond to the channel, thereby obtaining a postfix interference component to correspond to the each to-be-re-decoded modulation block, eliminating the prefix interference component and the postfix interference component from the each to-be-re-decoded modulation block, combining, by the combining means, the each to-be-re-decoded modulation block from which the prefix interference component and the postfix interference component are eliminated to generate a combined modulation block, storing a decoding result of decoding the combined modulation block in the decoded block buffer, and setting each modulation block received just before the to-be-re-decoded modulation block in the received modulation block buffer to correspond to each of the reception antennas as a new to-be-re-decoded modulation block, and control means for controlling the re-decoding means to repeatedly perform a processing by a desired number of times.

Effects of the Invention

According to the present invention, it is possible to dispense with the cyclic prefix as required in the OFDM and for the receiver side to make orthogonal separation of codes. At the same time, the frequency diversity effect that cannot be realized in the OFDM can be attained. This can thereby realize low bit error rate. It is also possible to cancel the interference between the modulation blocks due to the distortion of the channel, thus making it possible to realize high efficiency transmission even without need of the guard interval.

BEST MODE FOR CARRYING OUT THE INVENTION

FIG. 1 is a diagram showing an example of a modulation processing unit included in a code division multiplexing transmission system according to an embodiment of the present invention.

A modulation processing unit 10 includes an S/P conversion unit 11, a multiplication unit 13, a summation unit 15 and a waveform shaping filter unit 17. It is to be noted that there is no need to insert a cyclic prefix as required in the OFDM but that a guard interval in which no signals are transmitted is provided between adjacent code blocks so as to suppress interference among N-order blocks. This modulation processing unit 10 is characterized in that the multiplication unit 13 performs a multiplication on a selected time block code E_i[n], to be described later, to obtain S[i]. To describe the time block code E_i[n], a channel matrix H will first be described.

FIG. 2 is a diagram explaining the channel matrix H.

In FIG. 2, h[n] represents a sampling sequence for channel impulse response. The channel is assumed to be represented by band-limited zero IF. Therefore, h[n] is a complex number. For example, if an N-order transmit signal vector A (where A is a column vector) is transmitted, a signal vector B (where B is an M-order column vector) received after passing the channel is represented as B=HA. To give the channel matrix H shown in FIG. 2 means that matrix operation HA performs a convolution operation on time-series signals. FIG. 3 shows an example of a specific method of setting h[n]. The h[n] can be estimated by causing a transmitter side to transmit such a pilot signal as an M-sequence signal and to perform a circular convolution operation between the M-sequence signal and the received pilot signal. A leading K symbol is given as h[n] based on output after the circular convolution operation. In selection of the K, it is a condition that K+1 symbol and the following symbols have sufficiently small output values. Further, the h[n] is set to provide a causal system in which h[n]≠0. If the h[n] is set in this way, an H matrix (M rows by N columns) is generated. The H matrix is a rank N matrix.

FIG. 4 is a diagram typically showing the time block code E_i[n] according to the present invention.

Each time block code E_i[n] is selected as an eigen vector of $H^H H$ serving as a coupled system. $H^H$ means a matched filter to the channel H. $Q=H^H H$ has a relation of Hermitian symmetry, that is, $Q^H=Q$. Eigen vectors of such Hermitian symmetric matrix are orthogonal to one another and the eigen vectors are real numbers. Further, since H is a rank-N matrix, Q is a regular matrix (an inverse matrix to which is present). By selecting eigen vectors of the $H^H H$ as the time block code vectors E_i, even if the time block code vectors E_i are transmitted via the channel H and the matched filter $H^H$ to the channel H, the receiver side receives waveforms similar to the time block codes E_i. This feature means that equivalent distortionless transmission is performed. Besides, the respective time block code vectors E_i are orthogonal to one another and this orthogonality is maintained even in the receiver. It is to be noted that sinusoidal waves are used as E_i in the OFDM that is the conventional technique.

FIG. 5 is a diagram showing an example of a demodulation processing unit included in the code division multiplexing transmission system according to the embodiment of the present invention. FIG. 6 is a diagram explaining M symbol sampling operation and $H^H$ filtering operation according to the present invention.

A demodulation processing unit 20 includes an M symbol sampling unit 21, a filter 23 and an inner product unit 25. As shown in FIG. 6, a received continuous time signal r(t) is sampled by the M symbol sampling unit 21 to obtain an output vector R. Further, as shown in FIG. 6, the vector R passes through the complex conjugate transpose matrix $H^H$ serving as a filter to obtain a vector R_f. Specifically, R_f=$H^H$R is calculated. As already stated, the $H^H$ is the matched filter to the channel H. Accordingly, causing the signal received by the receiver to pass through the filter $H^H$ means realizing path diversity. The inner product unit 25 calculates an inner product between the vector R_f and each time block code vector E_i. Since the time block code vectors E_i are orthogonal to one another, only a component of the S[i] signal is obtained by calculating the inner product between the vector R_f and each time block code vector E_i. Actually, S^(hat)[i] is obtained due to noise.

In the code division multiplexing transmission system that includes the modulation processing unit 10 and the demodulation processing unit 20, the orthogonality among the time block codes is maintained without using the cyclic prefix differently from the conventional OFDM. Moreover, since the filter $H^H$ is the matched filter to the channel H, the effect of frequency diversity can be obtained. As stated, there is no need to provide the cyclic prefix as required in the OFDM and the effect of the frequency diversity that cannot be realized by the orthogonal separation of codes and the OFDM can be simultaneously attained. As a consequence, a low bit error rate can be attained.

The principle of the above-stated content will further be described. By using the eigen vectors of H'=$H^H$H as the time block codes, important characteristics eventually appear. That is, H'=$H^H$H is the Hermitian symmetric matrix, the eigen vectors E_i of the matrix H'=$H^H$H are orthogonal to one another, and eigen values $\lambda_I$ thereof are all actual numbers. This follows that if the inner product between the output signal $R_f$ after passing through the filter $H^H$ and each time block code $E_i$ is calculated, time block code components other than the time block code are zero. Although the signal is transmitted on the distorted channel, the orthogonality among the time block codes is maintained and the effect of the path diversity that is the advantage of the distorted channel is maintained. Accordingly, it is possible to simultaneously attain the two effects that are difficult to attain conventionally. With the time block codes used in the proposed code division multiplexing modulation, the recovery of the orthogonality by nonlinear processings such as CP addition and GI elimination is not performed differently from the OFDM and there is no need to add the CP to each time block code. However, when a signal is input to the filter $H^H$ in the receiver, it is necessary to use the signal which sampled M times longer than a code length N of one modulation block by K−1. This processing means that spread parts of modulation signal components on the time axis due to the distortion are used in the demodulation without exception.

The proposed modulation will be additionally described in detail. First, a transmit vector in the proposed code division multiplexing transmission is given by the following Equation (1). A vector X (indicated by→in the Equation (1)) is an N-order vector. A reception vector at an input point of the receiver is represented by Equation (2). An order of each of vectors n and R is M. A received signal vector $R_f$ after passing the filter $H^H$ is represented by Equation (3). It is to be noted that the vector $R_f$ is an N-order vector. An inner product, that is, $E_k^H R_f$ between the received signal vector $R_f$ and a k-th code vector $E_k$ is calculated as represented by Equation (4). In this way, by calculating the inner product between the received signal vector $R_f$ after passing through the matched filter $H^H$ and each code vector $E_k$ only a modulated symbol $S_k$ multiplied by an actual number $\lambda_k$ is obtained from the orthogonality among the code vectors. Finally, SN during decoding is calculated from Equation (5). It is to be noted that E{*} denotes an expected value.

Next, as indicated by the Equation (5), the output SN relative to each modulated symbol $S_k$ is proportional to the eigen value $\lambda_k$. If a mean bit error rate obtained by averaging error rates of the respective modulated symbols is defined, the mean bit error rate can be reduced by giving a weight to a transmit power of each code vector. Specifically, each code vector $E_k$ is transformed as represented by Equation (6), the purpose of reduction can be attained. Nevertheless, to keep total transmit power constant, a coefficient $w_k$ should satisfy Equation (7).

Setting of the weight coefficient $w_k$ will be described specifically while referring to an example. If the weight coefficient $w_k$ is set to proportional to an inverse number of the eigen value $\lambda_k$ relative to each code vector, it is possible to suppress frequent occurrence of bit errors for the code vectors the eigen values for which are smaller than 1. More generally, the weight coefficient $w_k$ is set to be proportional to $\lambda_k^{-\alpha}$. An optimal value of α varies according to channel characteristics but is empirically present in a range of 0.5 to 1. Furthermore, if a weighting processing is performed on the code vector having an excessively small eigen value so that the weight factor $w_k$ of the code vector is proportional to $\lambda_k^{-\alpha}$, weights of the other code vector are required to be set small due to conditions represented by Equation (7). Therefore, if the inverse number of the eigen value exceeds a value TE, a restriction is often given to set the inverse value to be equal to the value TE or such a code vector is not often used for information transmission.

Furthermore, another well-known method can be adopted with views of maximizing channel capacity for another setting of the weight coefficient $w_k$. According to the water filling principle, the channel capacity can be maximized by giving the weight coefficient as represented by Equations (8) and (9).

According to the Equations (8) and (9), the weight coefficient $w_k$ is possibly negative. In this case, the code vector is not used for information transmission.

$$\vec{X} = \sum_{i=0}^{N-1} S_i \vec{E_i} \tag{1}$$

$$\vec{R} = H\vec{X} + \vec{n} = \sum_{i=0}^{N-1} S_i H\vec{E_i} + \vec{n} \tag{2}$$

$$\vec{R_f} = H^H \vec{R} \tag{3}$$

$$= H^H \left( \sum_{i=0}^{N-1} S_i H\vec{E_i} + \vec{n} \right)$$

$$= \sum_{i=0}^{N-1} S_i H^H H\vec{E_i} + H^H \vec{n}$$

$$= \sum_{i=0}^{N-1} S_i \lambda_i \vec{E_i} + H^H \vec{n}$$

-continued $$\vec{E_k}^H \vec{R_f} = \sum_{i=0}^{N-1} S_i \lambda_i \vec{E_k}^H \vec{E_i} + \vec{E_k}^H H^H \vec{n} \quad (4)$$

$$= S_k \lambda_k |\vec{E_k}|^2 + \vec{E_k}^H H^H \vec{n}$$

$$= S_k \lambda_k + (H\vec{E_k})^H \vec{n}$$

$$\frac{S}{N} = \frac{S_k \lambda_k (S_k^* \lambda_k^*)}{E\left\{(H\vec{E_k})^H \vec{n} \vec{n}^H H \vec{E_k}\right\}} \quad (5)$$

$$= \frac{|\lambda_k|^2 |S_k|^2}{E\left\{\vec{E_k}^H H^H |\vec{n}|^2 H \vec{E_k}\right\}}$$

$$= \frac{\lambda_k^2 |S_k|^2}{E\{|\vec{n}|^2\} \lambda_k |\vec{E_k}|^2}$$

$$= \frac{\lambda_k |S_k|^2}{E\{|\vec{n}|^2\}}$$

$$\vec{E_k} \Rightarrow \sqrt{w_k} \vec{E_k} \quad (6)$$

$$\sum_{k=0}^{N-1} w_k = 1 \quad (7)$$

$$w_k = P - \frac{1}{\lambda_k} \quad (8)$$

$$P = \frac{1}{N}\left(1 + \sum_{i=0}^{N-1} \frac{1}{\lambda_i}\right) \quad (9)$$

FIGS. 7 to 9 are diagrams explaining an M symbol sampling method and an $H^H$ filtering method without guard intervals according to the embodiment of the present invention.

The description has been given so far on the premise of the N-order isolated modulation block. However, as shown in FIG. 7, one modulation block interferes with an adjacent modulation block due to a distortion of the channel. A delay wave component having a delay out of an interval of the modulation block generated from one modulation block due to the distortion of the channel is defined as an interference tail. A length of the interference tail depends on the degree of the distortion of the channel and not depend on the code length N. Namely, if the code length N is larger, the relative interference between the modulation blocks can be reduced. Therefore, if the code length N is set large enough to cause the interference tail to influence only the next adjacent block and not influence the following blocks adjacent to the next adjacent block, each modulation block receives only a prefix interference (Pre IF) from a modulation block just before the modulation block and a postfix interference (Post IF) from a modulation block just after the modulation block as shown in FIG. 8.

To lessen these interferences, a technique for providing such a guard interval as the OFDM between modulation blocks as a buffer interval may be considered. However, in the guard interval, information signals cannot be transmitted and data transmission efficiency thereby deteriorates. Therefore, a technique for re-modulating decoding results of modulation blocks before and after a pre-decoded signal and subtracting interference components from the re-modulated results without providing guard intervals will be described. To improve interference elimination performance, a decoding method for decoding several blocks repeatedly retrospectively whenever a modulation block is received to thereby induce high interference elimination performance will be described.

Referring to FIG. 9, it is assumed that the receiver receives a signal block SC at timing $t_1$. The receiver instantly decodes the signal block SC and obtains a decoding result SC_1. At this time, the Pre IF component which the SC receives from a received block SB just before the block SC is eliminated using a previous decoding result SB_1. Specifically, the decoding result SB_1 is re-modulated, the Pre IF component is estimated using the channel matrix grasped by the receiver and the Pre IF component is subtracted from the pre-decoded signal of the SC. After decoding to obtain the SC_1, the SB is instantly re-decoded. At the time of re-decoding, decoding results SA_2 and SC_1 of blocks adjacent to the SB are used. Specifically, the Pre IF component is calculated from the SA_2 and the Post IF component is calculated from the SC_1, each of the Pre IF component and the Post IF component are subtracted from the pre-decoded signal of the SB, the SB is decoded to obtain the decoding result SB_2. Likewise, the SA is decoded third times using decoding results of the blocks adjacent to the block SA to obtain a decoding result SA_3. FIG. 9 shows appearance of performing the above-stated processing retrospectively on four modulation blocks before the modulation block of interest.

During decoding of the SC to obtain the SC_1, only the Pre IF component from the modulation block SB just before the block SC is eliminated. During second decoding of the SC to obtain a decoding result SC_2, the SC is decoded after eliminating the Pre IF component and the Post IF component from the modulation blocks before and after the block SC, respectively. Due to this, the interference is lessened as compared with decoding of the SC to obtain the decoding result SC_1. Furthermore, during decoding of the SC to obtain a decoding result SC_3, decoding results (SD_2 and SB_3) from which error is lessened from decoding results (SD_1 and SB_2) used during decoding of the SC to SC_2 are used to eliminate the interference. Therefore, the interference can be eliminated more accurately from the decoding result SC_3 than the SC_2. By repeating this processing, it is considered that decoding error is lessened.

It is to be noted that the interference elimination using the repetitive decoding without insertion of the GI is difficult to apply to the OFDM. This is because interference among sub-carriers (inter channel interference, ICI) even in the same block occurs to the OFDM without adding the CP into the GI as a problem prior to occurrence of the inter block interference.

The interference elimination according to the present invention can dispense with the GI and addition of the CP. As a result, if a modulation bandwidth decided by a chip rate is identical to that of the OFDM, information signals can be transmitted at higher information rate by the code division multiplexing transmission according to the present invention. Alternatively, if code vectors having smaller eigen values are not transmitted intentionally so as to set an information transmission rate of multiplexing of code vectors having smaller eigen values equal to that of the OFDM, the decoded bit error can be dramatically improved.

FIG. 10 shows an example of a decoding processing unit performing the operation shown in FIG. 9. FIG. 11 is a diagram showing an internal configuration of a canceller shown in FIG. 10. FIG. 12 is a flowchart describing operation performed by the canceller shown in FIG. 11. The processing described with reference to FIG. 9 will be additionally described from both hardware and software aspects.

In FIG. 10 differently from FIG. 5, a decoding processing unit 27 includes a canceller 29. The canceller 29 includes a reception unit 29a, a re-decoding unit 29b, a control unit 29c and a block buffer unit 29d. The block buffer unit 29d includes a received modulation block buffer recording a received modulation block signal and a decoded block buffer recording a decoding result of each received modulation block signal. The received modulation block buffer buffers an analog signal received before decoding. The decoded block buffer stores therein a digital decoded bit from the received modulation block. Referring to FIG. 12, the operation performed by the canceller 29 will be described below.

In a step ST1, the reception unit 29a determines that a new modulation block has been received. When the new modulation block is received, the received modulation block A is stored in the received modulation block buffer in a step ST2. Further in the step ST2, a latest decoding result of a modulation block B received just before the modulation block A recorded in the decoded block buffer is re-modulated and filtered to correspond to the channel, thereby obtaining a prefix interference component which the modulation block A receives from the modulation block B, the prefix interference component is eliminated from the modulation block A and the modulation block A is decoded, a decoding result of the modulation block A is stored in the decoded block buffer and a second latest modulation block among the modulation blocks in the received modulation block buffer is set as a to-be-re-decoded modulation block. In a step ST3, a latest decoding result of a modulation block received just before the to-be-re-decoded modulation block is read from the decoded block buffer, re-modulated and filtered to correspond to the channel, thereby obtaining a prefix interference component for the to-be-re-decoded modulation block. Further, a latest decoding result of a modulation block received just after the to-be-re-decoded modulation block is read from the decoding buffer, re-modulated and filtered to correspond to the channel, thereby obtaining a postfix interference component. The prefix interference component and the postfix interference component are eliminated from the to-be-re-decoded modulation block and the resultant to-be-re-decoded modulation block is decoded to obtain a decoding result. The decoding result is stored in the decoded block buffer. Further, in a step ST5, an update processing for setting the modulation block received just before the to-be-re-decoded modulation block stored in the received modulation block as a new to-be-re-decoded modulation block is performed. Processings of the steps ST4 and ST6 are repeatedly performed by a desired number of times.

FIG. 13 is a diagram showing a MIMO-based code division multiplexing transmission system according to an embodiment of the present invention.

This MIMO-based code division multiplexing transmission system 30 includes, in a transmitter 30a, a modulation processing unit 31, up-converters 33-1 to 33-n, RFs 35-1 to 35-n and transmit antennas TX_ANT-1 to TX_ANT-NT. Further, the code division multiplexing transmission system 30 includes, in a receiver 30b, reception antennas RX_ANT-1 to RX_ANT-NR, LNA&reception filters 37-1 to 37-n, down-converters 39-1 to 39-n and a demodulation processing unit 40. A signal transmitted from the transmitter 30a is received by the receiver 30b via a channel 41.

FIG. 14 is a diagram explaining a channel matrix H of the channel 41 shown in FIG. 13.

The channel 41 is a distorted MIMO channel. An entire channel matrix is formed by channel matrixes $H_{ij}$ between the transmit antennas TX_ANT-1 to TX_ANT-NT and the reception antennas RX_ANT-1 to RX_ANT-NR, respectively, and the channel matrix $H_{ij}$ is a channel matrix of M rows by N columns. An entire channel matrix $H_M$ for MIMO corresponding to the channel matrix H shown in FIG. 2 is shown in FIG. 15.

FIG. 16 is a diagram showing an internal configuration of the modulation processing unit 31 shown in FIG. 13.

The modulation processing unit 31 includes an S/P conversion unit 311, a multiplication unit 313, a summation unit 315 and waveform shaping filters 317-1 to 317-n. The multiplication unit 313 multiplies S[i] by $E_{M\_i}$, (where i=0 to NT*N−1). In this case, $E_{M\_i}$ is an eigen vector of $D=H_M^H H_M$ and D is a square matrix of (N*NT) rows by (N*NT) columns. $X_M[n]$ calculated by the summation unit 315 is represented by the following Equation.

$$\Sigma(i=0 \sim NT*N-1, S[i]*E_{M\_i}[n])$$

$X_{M\_i}$ denotes an N-order row vector representing an output symbol sequence from an $i^{th}$ antenna. This modulation processing unit 31 multiplies an information signal by time block codes and allocates resultant signals to the transmit antennas, respectively, thereby enabling parallel transmission.

FIG. 17 is a diagram showing an internal configuration of the decoding processing unit 40.

The decoding processing unit 40 includes M symbol sampling units 401-1 to 401-n, a combiner 403, a filter 405 and an inner product unit 407. In this case, R_i (i=1 to NR) denotes an M-order row vector and $R_M$ denotes a M*NR-order row vector. The $R_M$ is expressed by $H_M*X_M$, where $X_M$ is $(X_{M\_1}^T, X_{M\_2}^T, \ldots, X_{M\_N^T})^T$. $R_{M\_f}$ is obtained by the filter 405 using a complex conjugate transpose matrix $H_M^H$ shown in FIG. 18 and a N*NT-order row vector. Further, IN vectors input to the inner product unit 407 are all N*NT-order vectors. In this case, information transmitted from the respective transmit antennas are separately received by the reception antennas, respectively and the combiner 403 combines the reception signals received in parallel in order.

FIG. 19 shows an embodiment of a protocol of setting each time block code. An instance in which one-to-one communication is to be held will be considered. It is assumed that one will be referred to as a "leader" and the other will be referred to as a "follower". It is also assumed that a line from one to the other is a downlink and a line from the other to one is an uplink. The leader transmits a pilot signal for estimating a channel onto the downlink and the follower receives the pilot signal with a transmission delay. As the pilot signal, an M-sequence signal, for example, excellent in auto-correlation peak characteristic is used. If a plurality of antenna systems is used, the pilot signal is transmitted from respective transmit antennas in a time division fashion. After receiving the downlink pilot signal, the follower estimates a down channel matrix and sets downlink time block codes by the above-stated method. After completion of the setting of the downlink time block codes, the follower transmits a setting result of the time block codes to the leader on the uplink (different in frequency from the downlink in case of FDD and same as the downlink in case of TDD). This setting result is shared between the follower and the leader. After completing sharing the time block codes between the leader and the follower, data communication starts using the time block codes. If the above-stated interference canceler is not used, a time gap is inserted into every modulation block in each transmission block to lessen the interference between the adjacent modulation blocks.

FIG. 20 is a diagram showing a configuration of the demodulation processing unit shown in FIG. 17 in which a canceller 409 is provided. In this way, the canceller described with reference to FIGS. 9 to 12 may be applied to an MIMO-type system. The canceller described with reference to FIGS. 9 to 12 eliminates the prefix interference component and the postfix interference component from the received modulation block received by each antenna. The eliminating the interference by estimating the prefix interference component and postfix interference component is performed against received buffer. Due to this, the received modulation block buffer is necessary to correspond to each antenna. After eliminating the interference, the combiner 403 combines the signals and decodes the combined signal.

FIG. 21 is a diagram showing a result of examining a mean bit error rate relative to an energy-to-noise power density ratio (Eb/N0) per bit by changing repeat counts if the code division multiplexing transmission according to the present invention is combined with an interference canceller. One time to four times are displayed as repeat counts. Further, for comparison, FIG. 21 shows a characteristic if the interference is not cancelled and a characteristic if there is no interference between the code blocks. A length of each time block code is set to 16. As obvious from FIG. 21, mean bit error rate characteristic is closer to the characteristic if there is no interference between the code blocks as the repeat count is higher.

FIG. 22 is a diagram showing a mean bit error relative to the energy-to-noise power density (Eb/N0) per bit if the code division multiplexing transmission according to the present invention is performed. For comparison, FIG. 22 also shows a result of OFDM transmission. The number of sub-carriers of the OFDM is set to 64 and eight symbols are allocated as a guard interval. Accordingly, information transmission efficiency is 56/64=7/8. On the other hand, with the method according to the present invention ("Proposed Method" in FIG. 22), a length of each time block code is set to 16 and the interference canceller is actuated. Further, to make transmission efficiency equal to that of the OFDM, two codes having lower eigen values are not used for transmission (information transmission efficiency=14/16=7/8). As shown in FIG. 22, the method according to the present invention can attain an improvement in the mean bit error rate of, for example, $10^{-3}$ by about 10 dB. This improvement amount means that a transmission distance can be extended twice or more in, for example, an urban area where distance propagation loss is proportional to $3.5^{th}$ powers of the distance. And that also means a necessary transmission power can be reduced to one-tenth.

DESCRIPTION OF REFERENCE SYMBOLS 30, 100 Code division multiplexing transmission system
30a, 100a Transmitter
30b, 100b Receiver
10, 31 Modulation processing unit
20, 40 Demodulation processing unit

DRAWINGS

Figure 1:
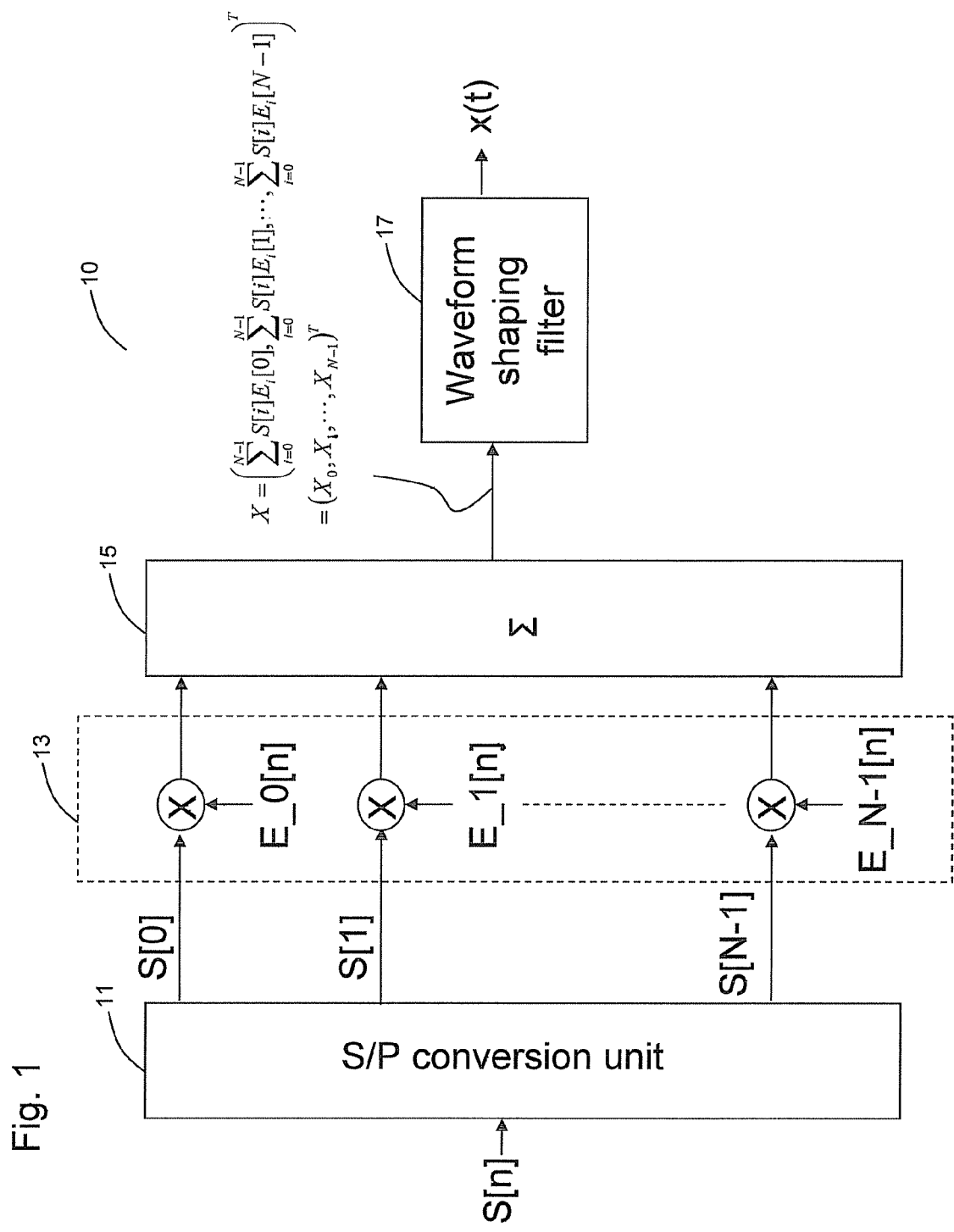
FIG. 1 is a diagram showing an example of a modulation processing unit of a code division multiplexing transmission system according to an embodiment of the present invention.
Figure 2:
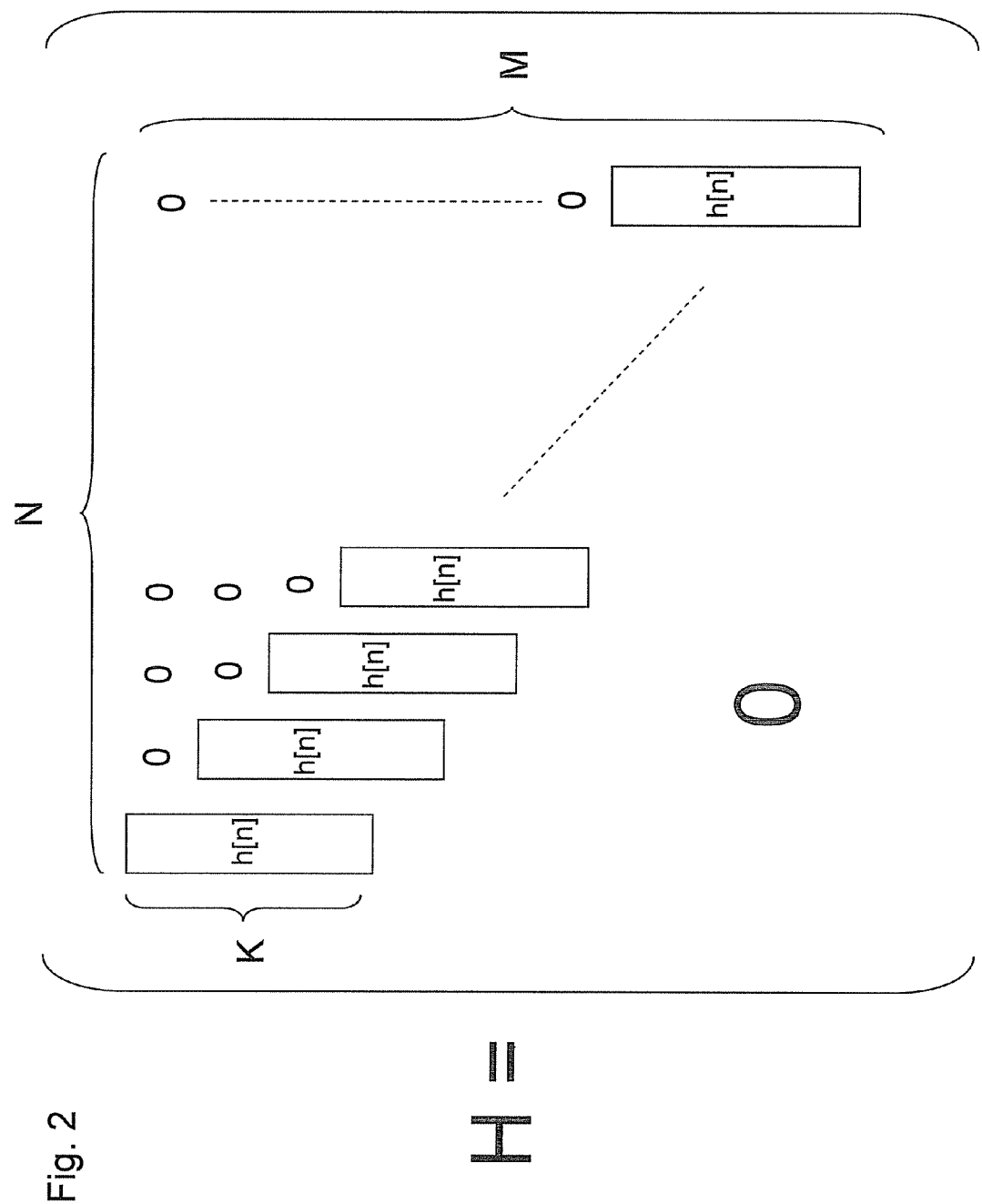
FIG. 2 is a diagram explaining a channel matrix H.
Figure 3:
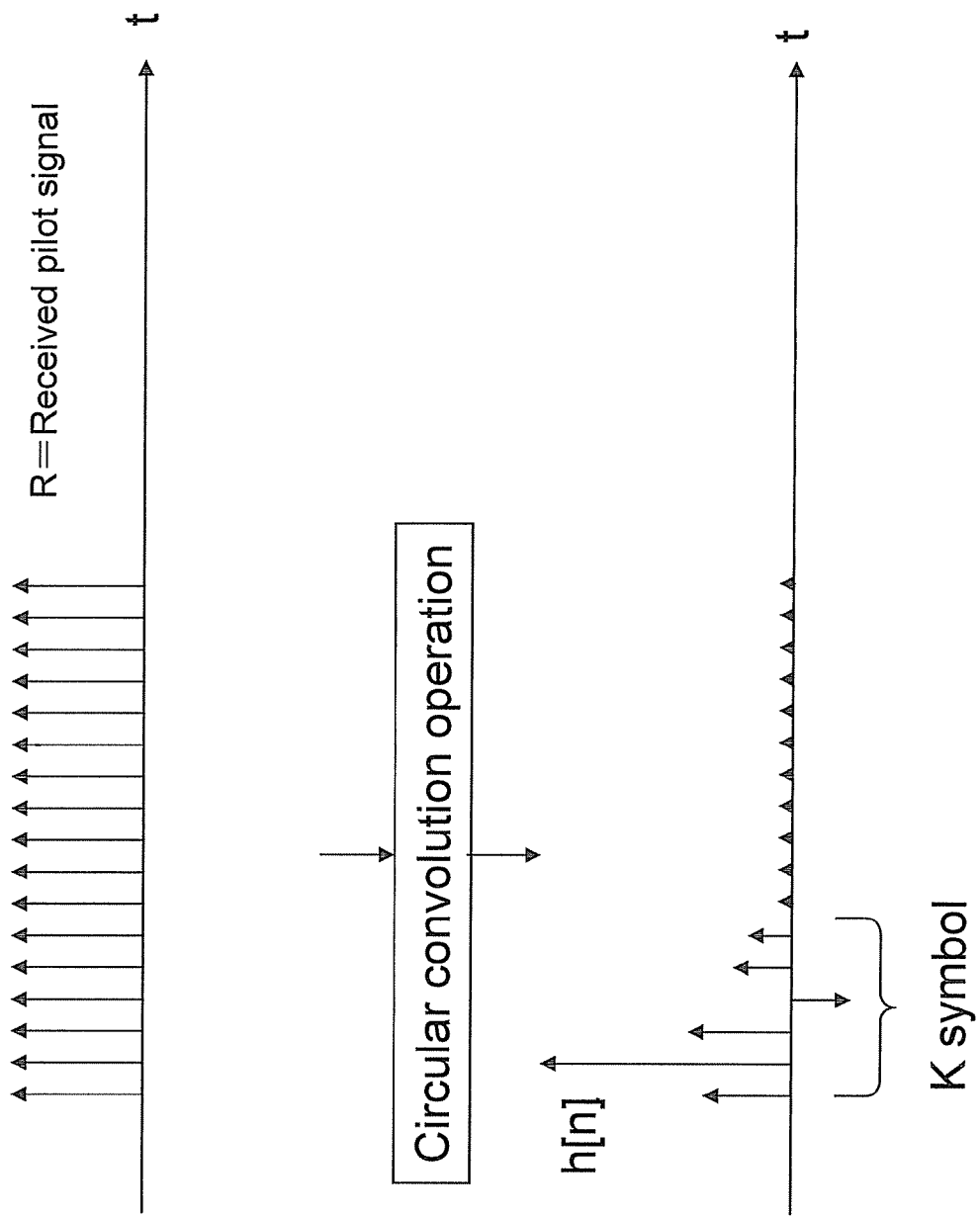
FIG. 3 is a diagram showing appearance of obtaining h[n] by performing a circular convolution operation on the channel matrix H.
Figure 4:
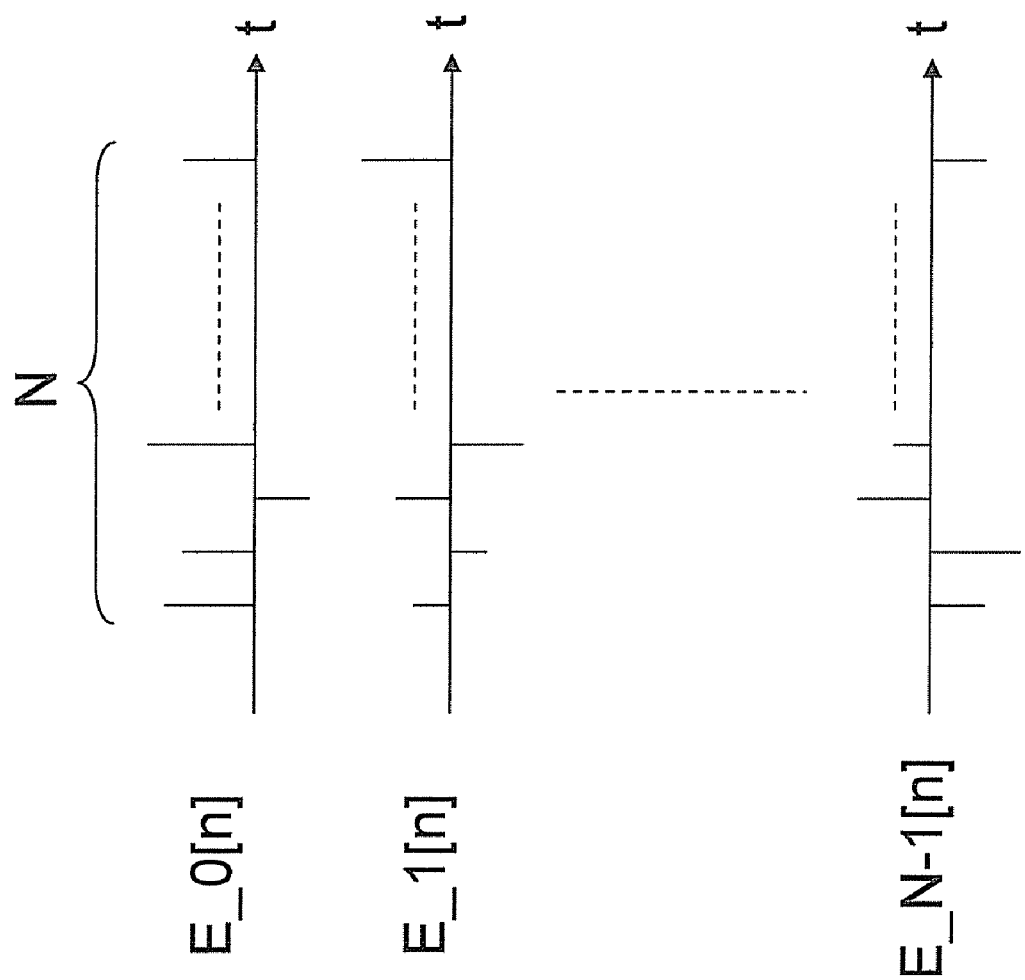
FIG. 4 is a diagram typically showing time block signals E_i[n] according to the present invention.
Figure 5:
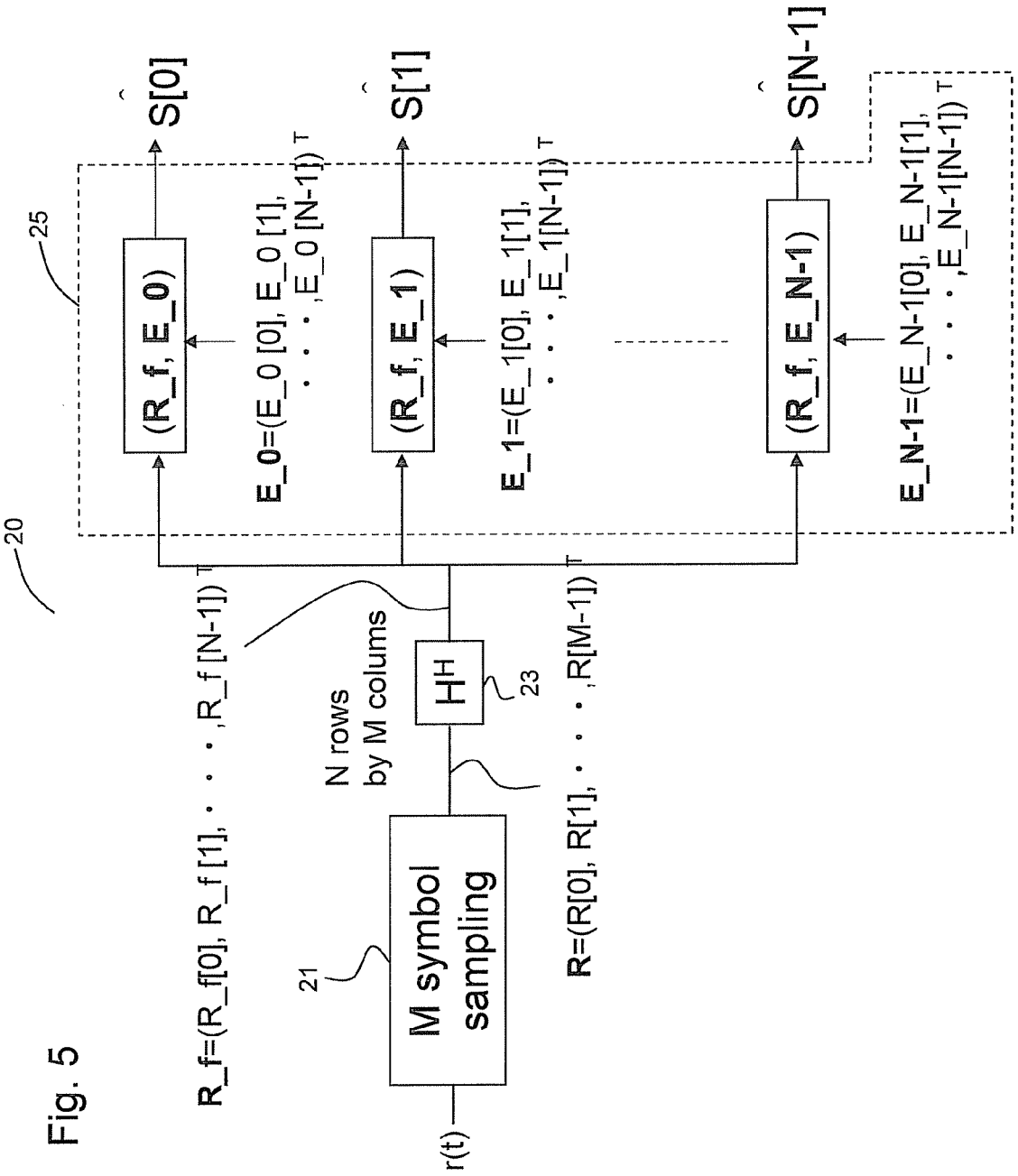
FIG. 5 is a diagram showing an example of a demodulation processing unit of the code division multiplexing transmission system according to the embodiment of the present invention.
Figure 6:
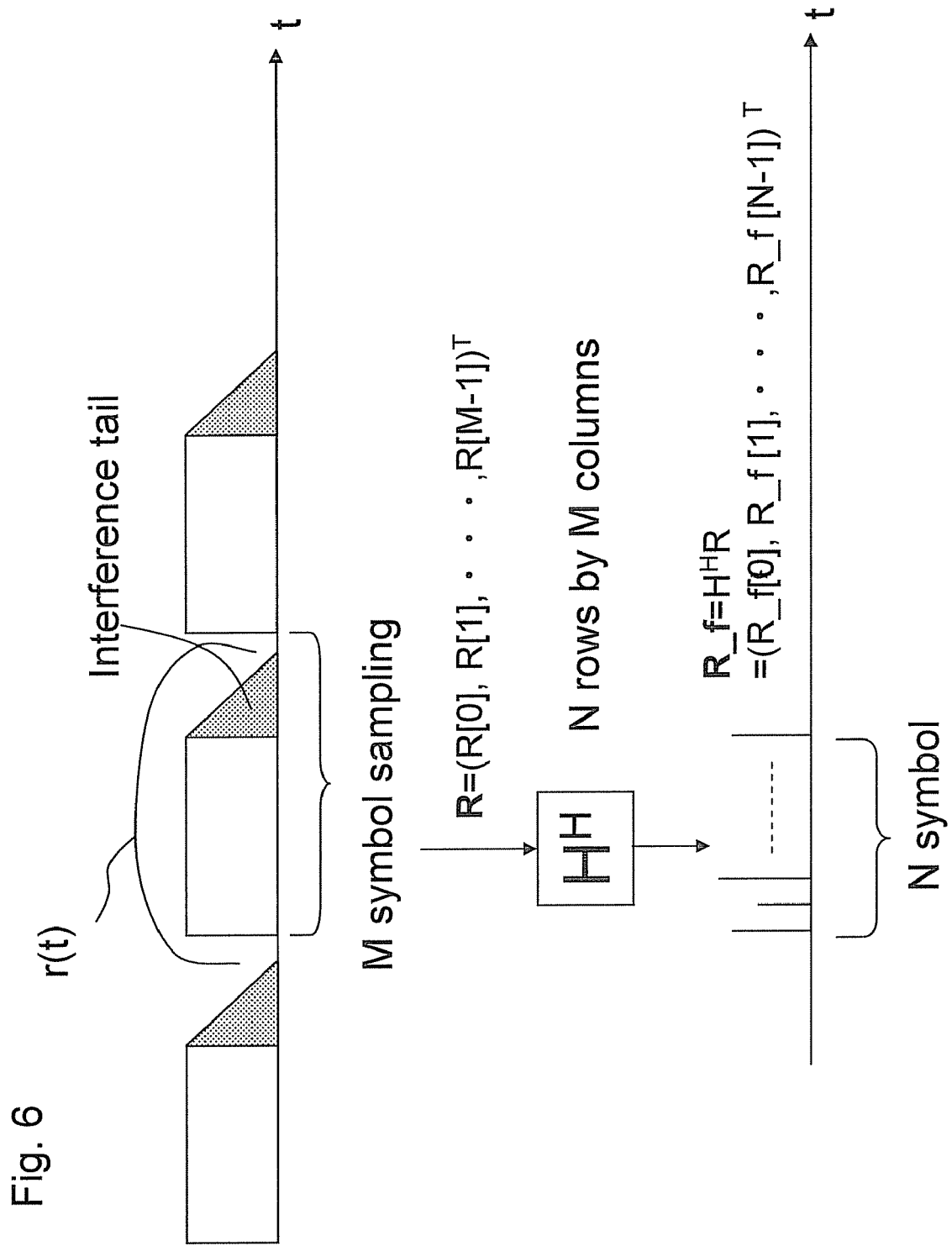
FIG. 6 is a diagram explaining M symbol sampling and $H^H$ filtering operations according to the present invention.
Figure 7:
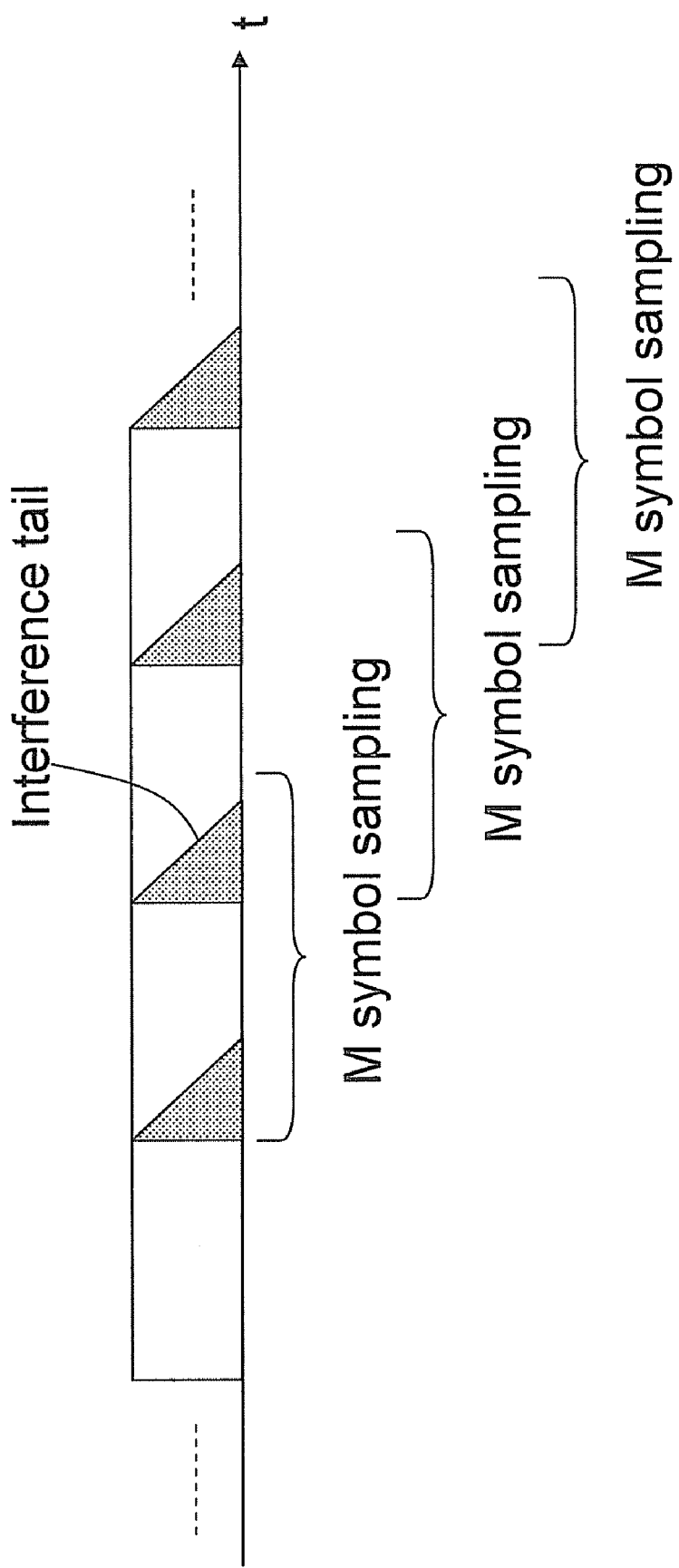
FIG. 7 is a first diagram explaining an M symbol sampling method and an $H^H$ filtering method if no guard interval is given according to the embodiment of the present invention.
Figure 8:
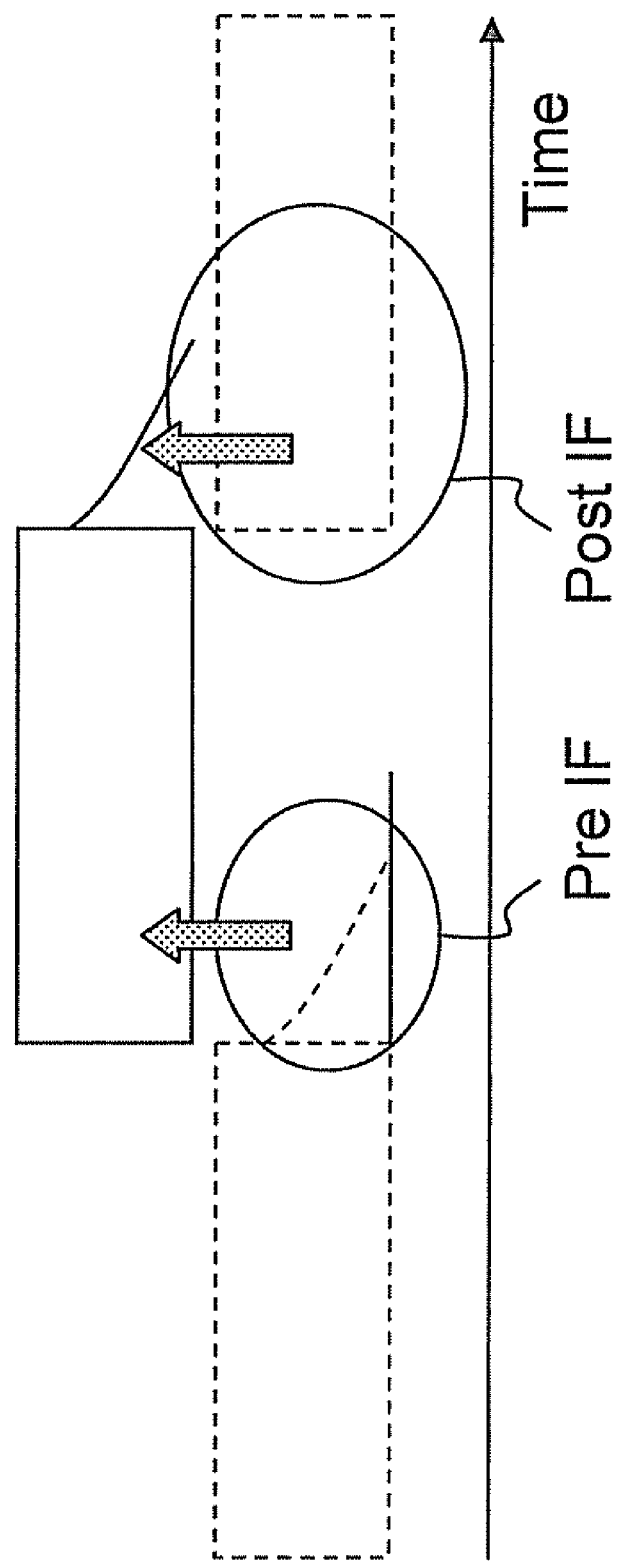
FIG. 8 is a second diagram explaining the M symbol sampling method and the $H^H$ filtering method if no guard interval is given according to the embodiment of the present invention.
Figure 9:
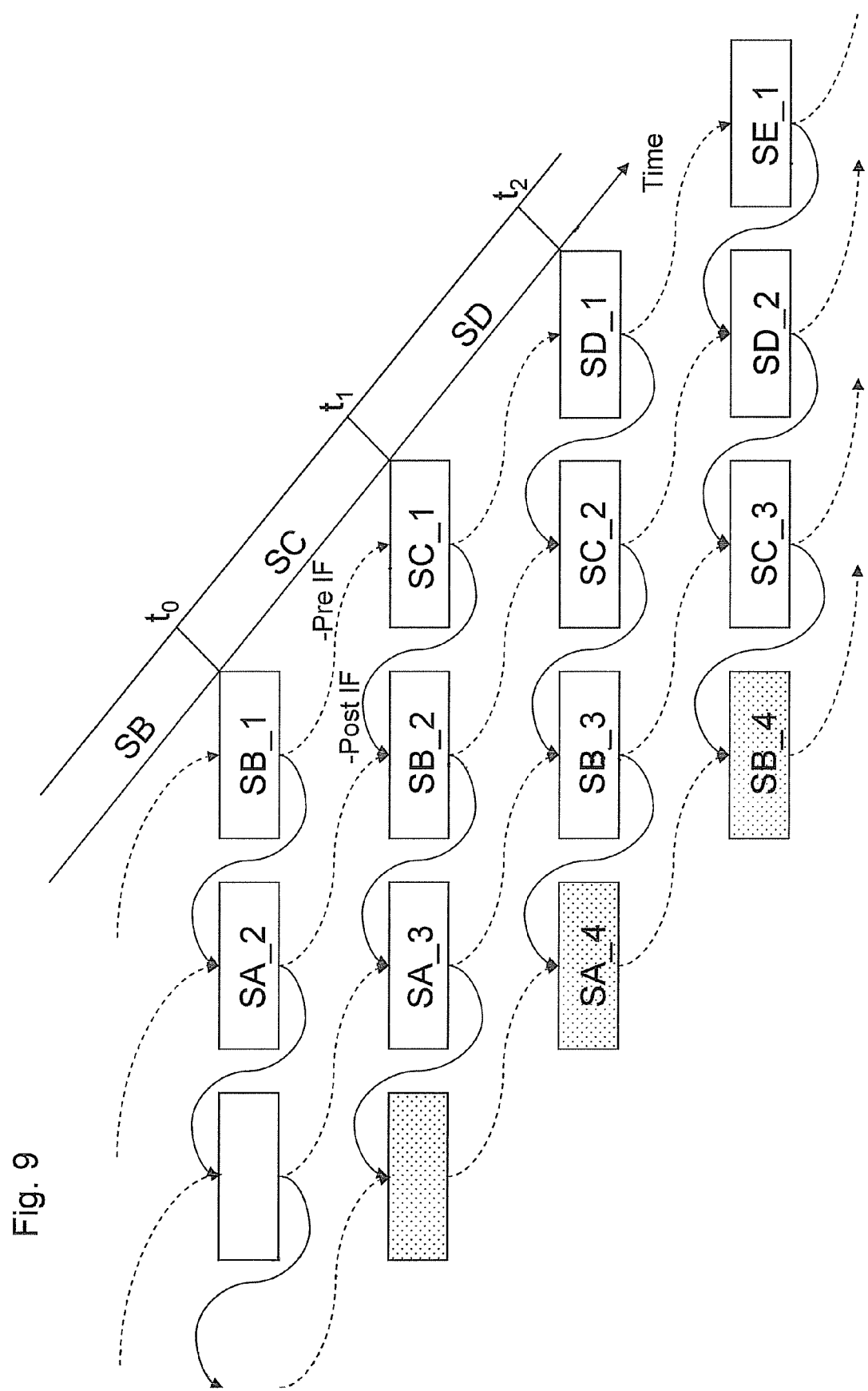
FIG. 9 is a third diagram explaining the M symbol sampling method and the $H^H$ filtering method if no guard interval is given according to the embodiment of the present invention.
Figure 10:
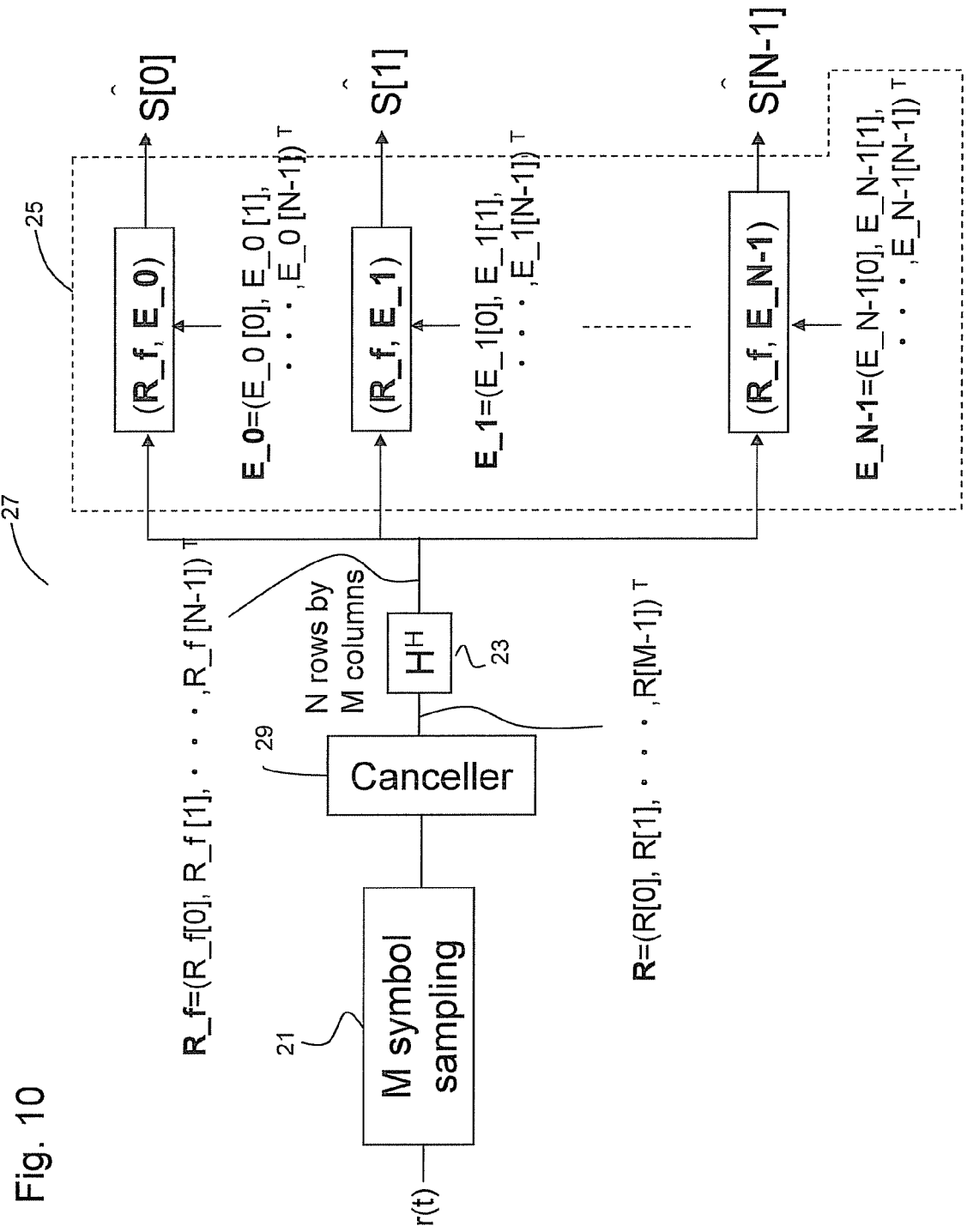
FIG. 10 is a diagram showing an example of the demodulation processing unit performing the operation shown in FIG. 9.
Figure 11:
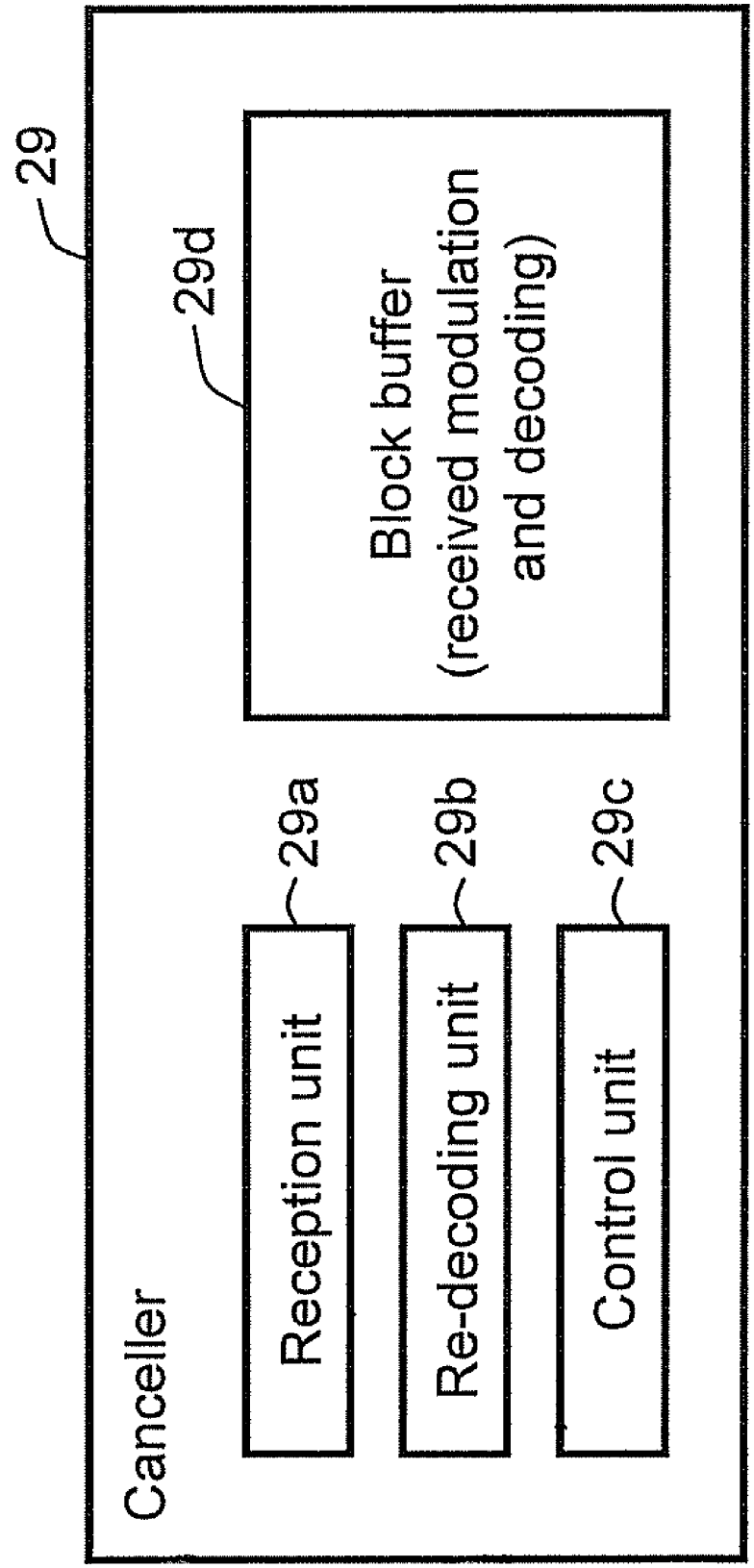
FIG. 11 is a diagram showing an internal configuration of a canceller shown in FIG. 10.
Figure 12:
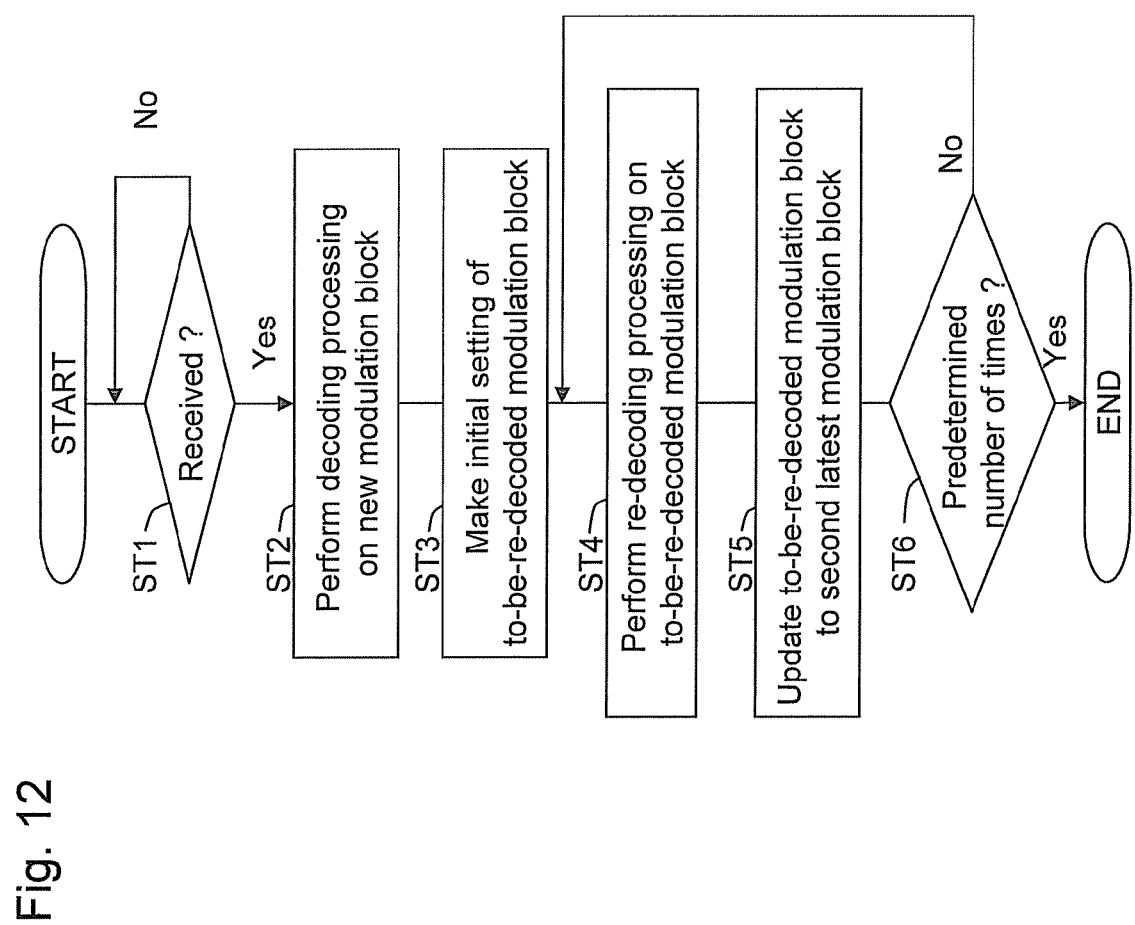
FIG. 12 is a flowchart explaining operation performed by the canceller shown in FIG. 11.
Figure 13:
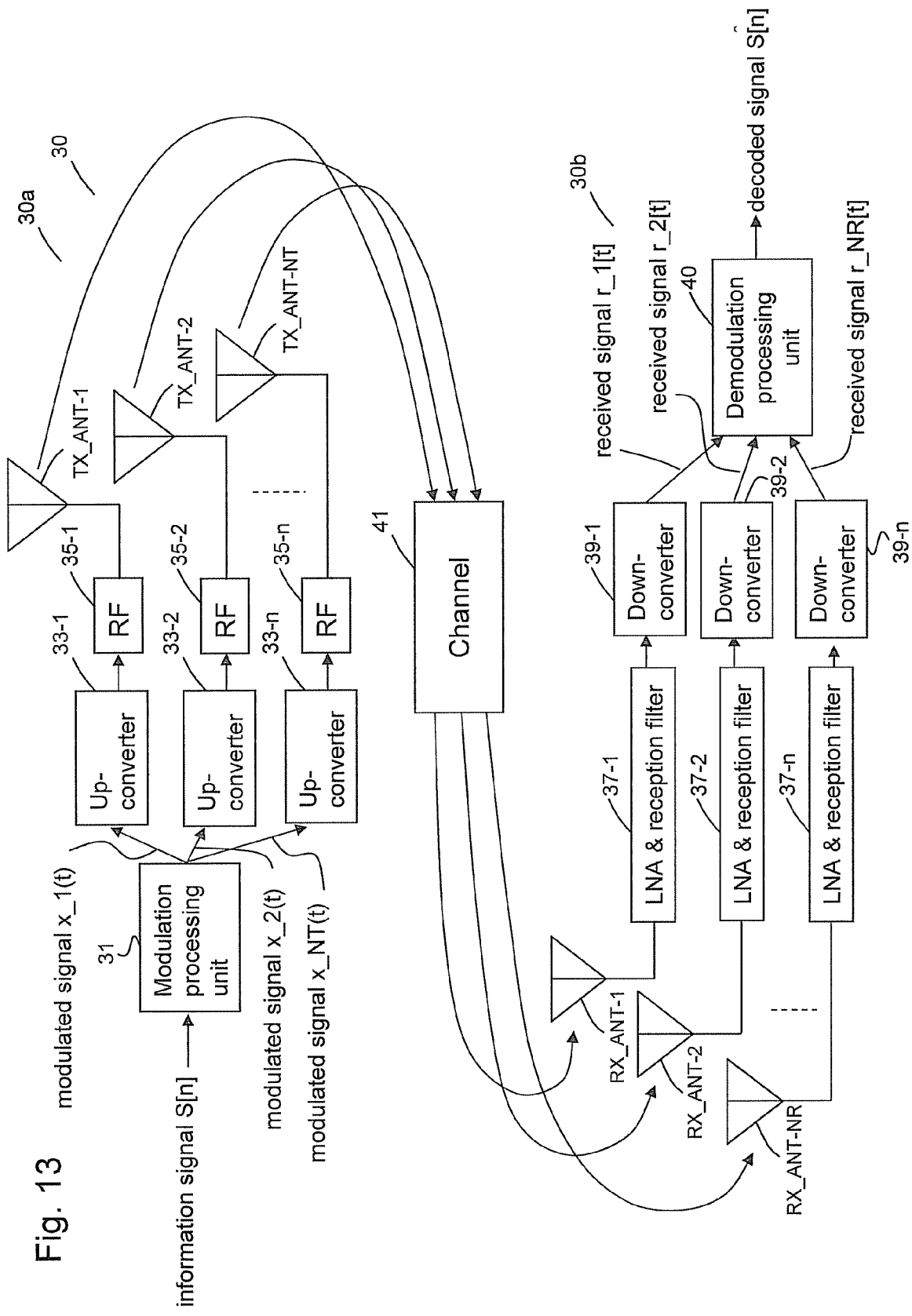
FIG. 13 is a diagram showing a MIMO-based code division multiplexing transmission system according to an embodiment of the present invention.
Figure 14:
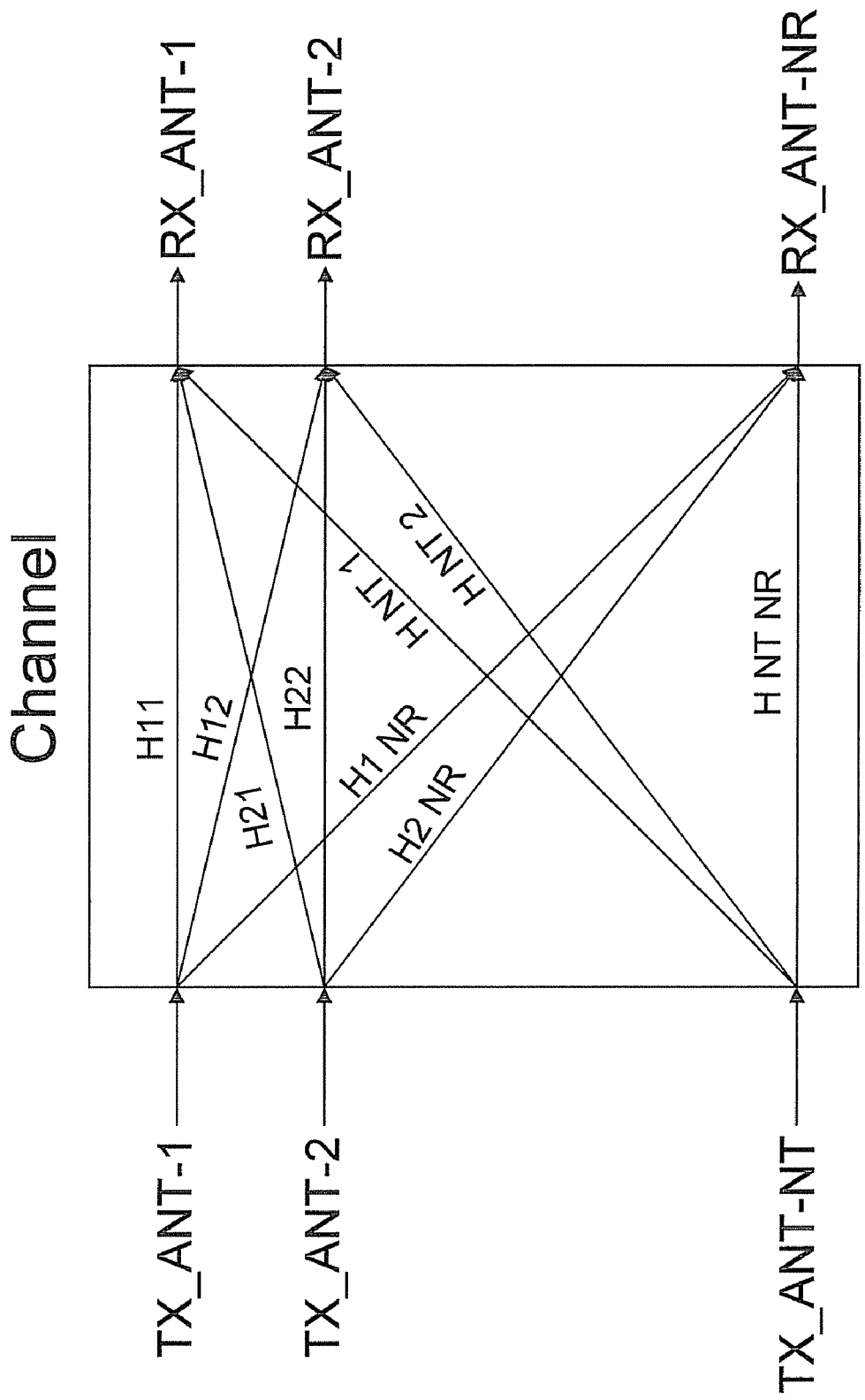
FIG. 14 is a diagram explaining a channel matrix H of a channel 41 shown in FIG. 13.
Figure 15:
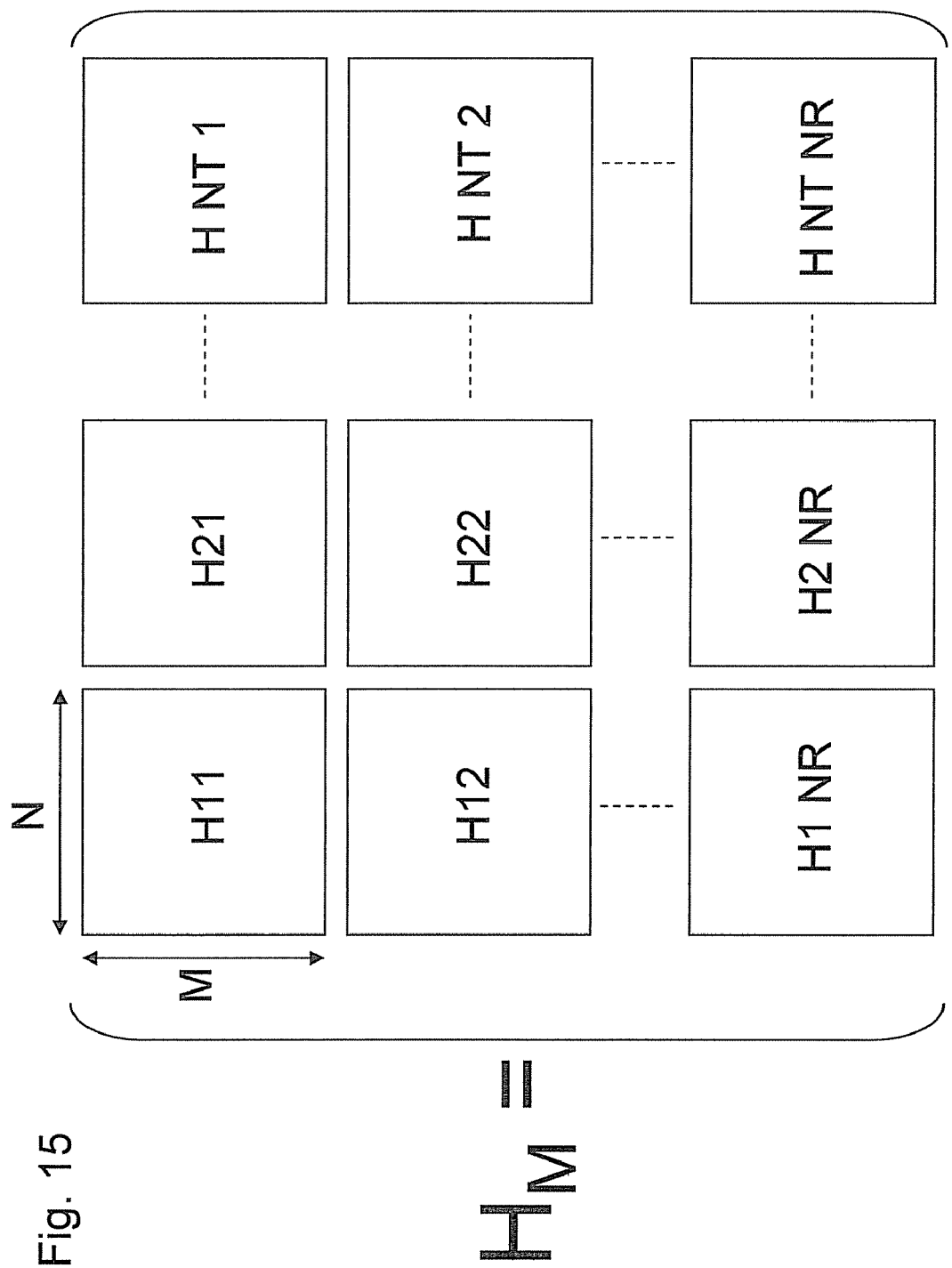
FIG. 15 is a diagram showing an entire channel matrix $H_M$ for the MIMO.
Figure 16:
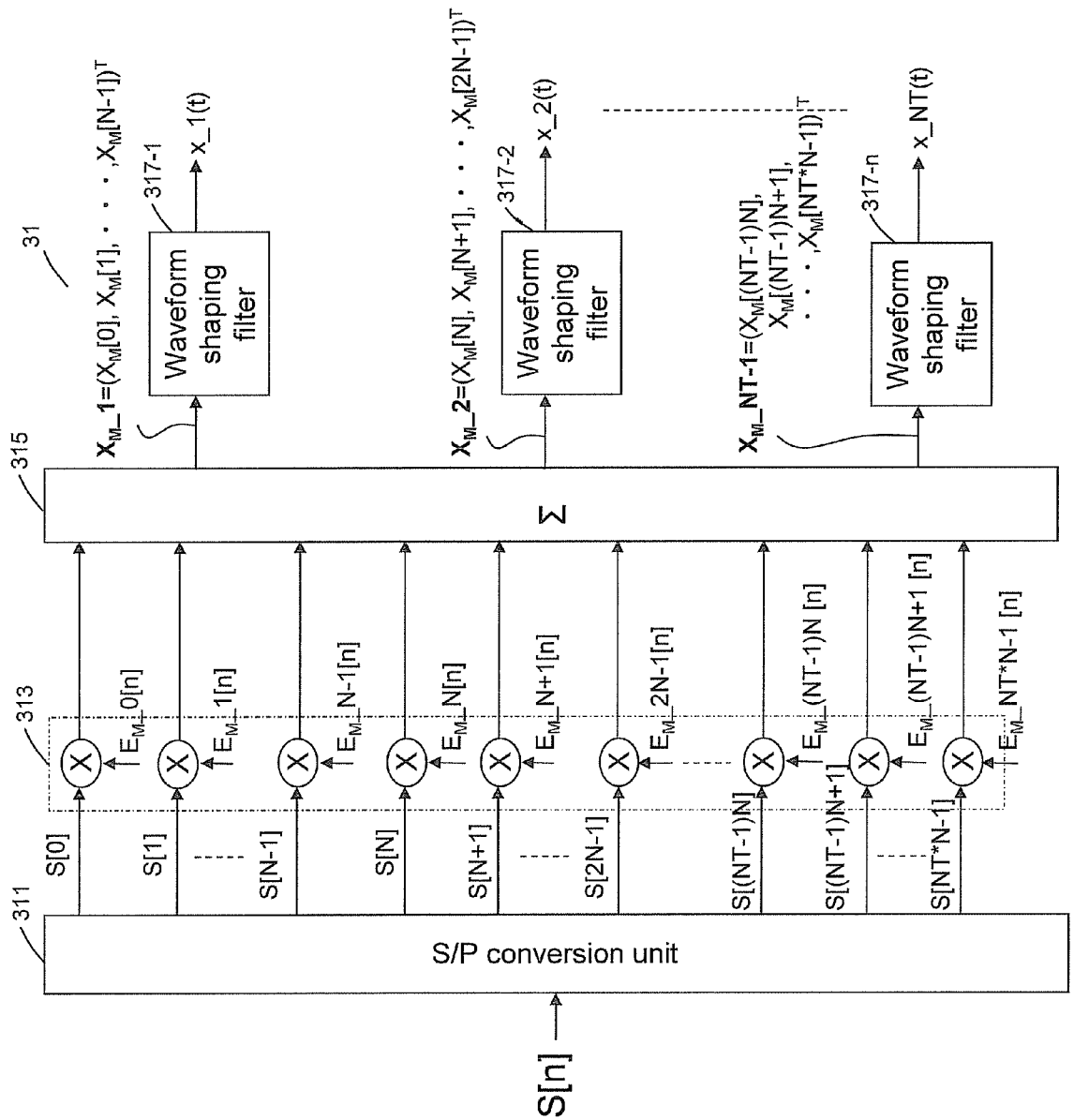
FIG. 16 is a diagram showing an internal configuration of a modulation processing unit 31 shown in FIG. 13.
Figure 17:
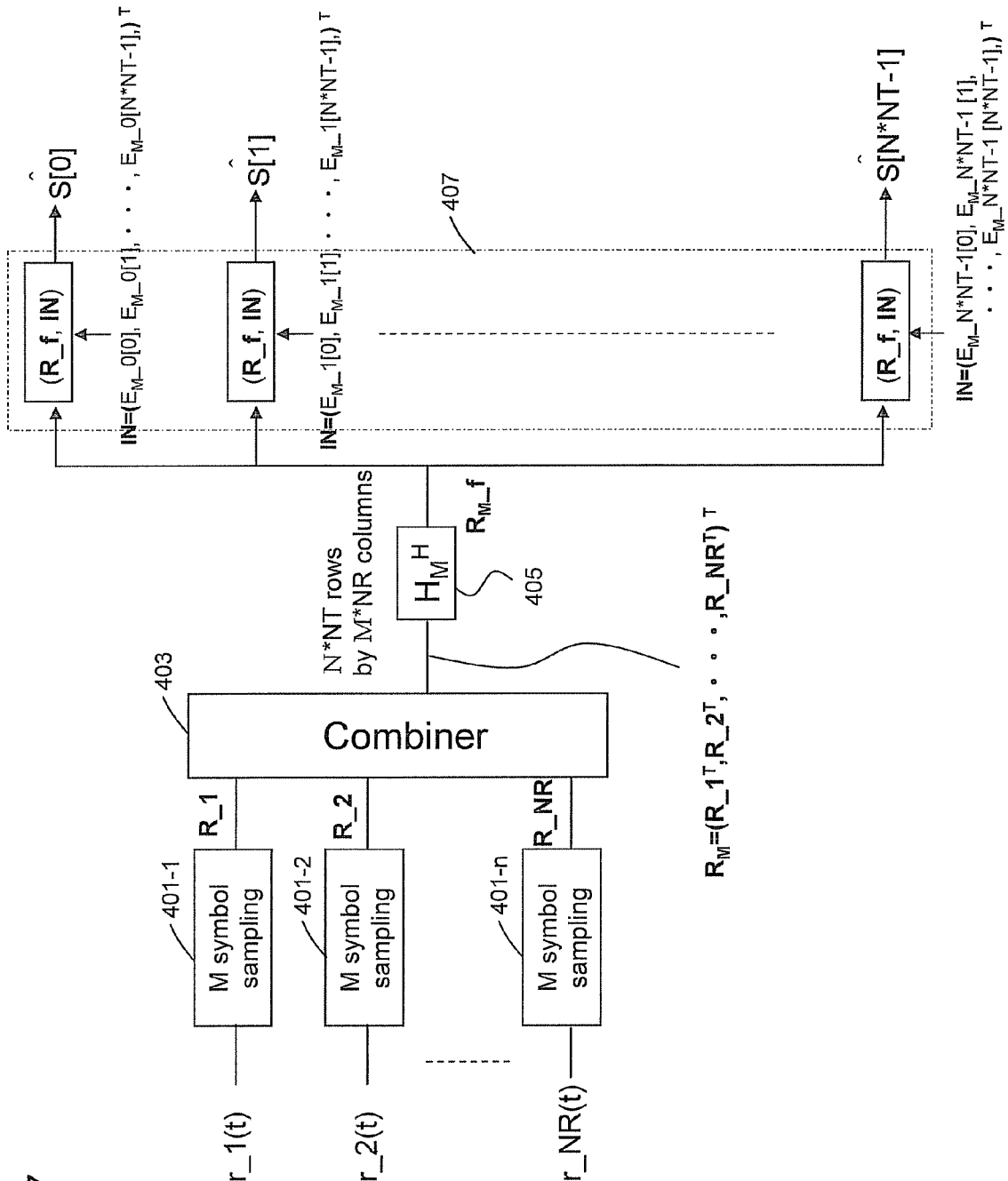
FIG. 17 is a diagram showing an internal configuration of a demodulation processing unit 40 shown in FIG. 13.
Figure 18:
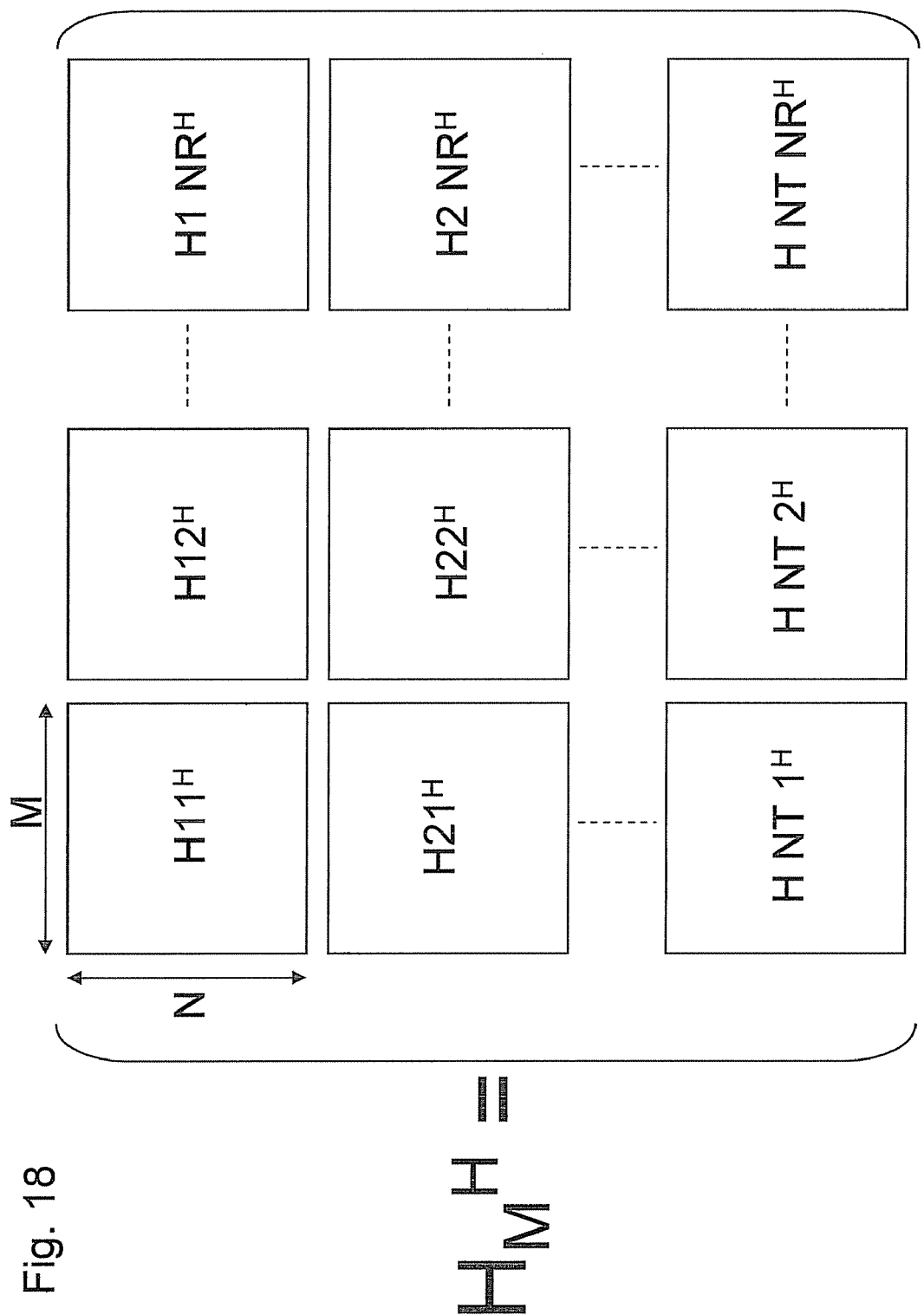
FIG. 18 is a diagram showing a complex conjugate transpose matrix $H_M^H$ corresponding to the channel matrix $H_M$ shown in FIG. 15.
Figure 19:
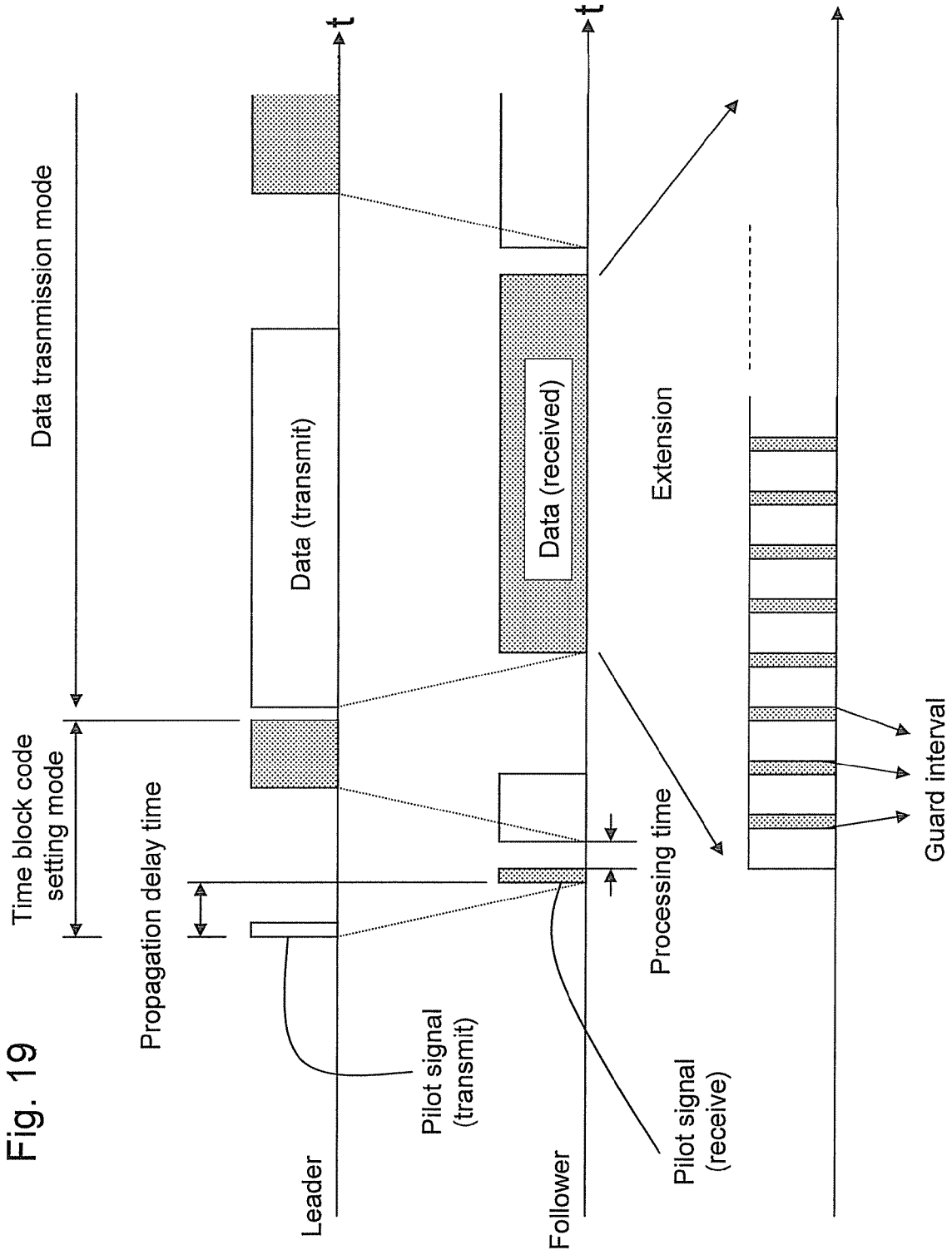
FIG. 19 is a diagram showing a state of a transmission protocol in case of FDD.
Figure 20:
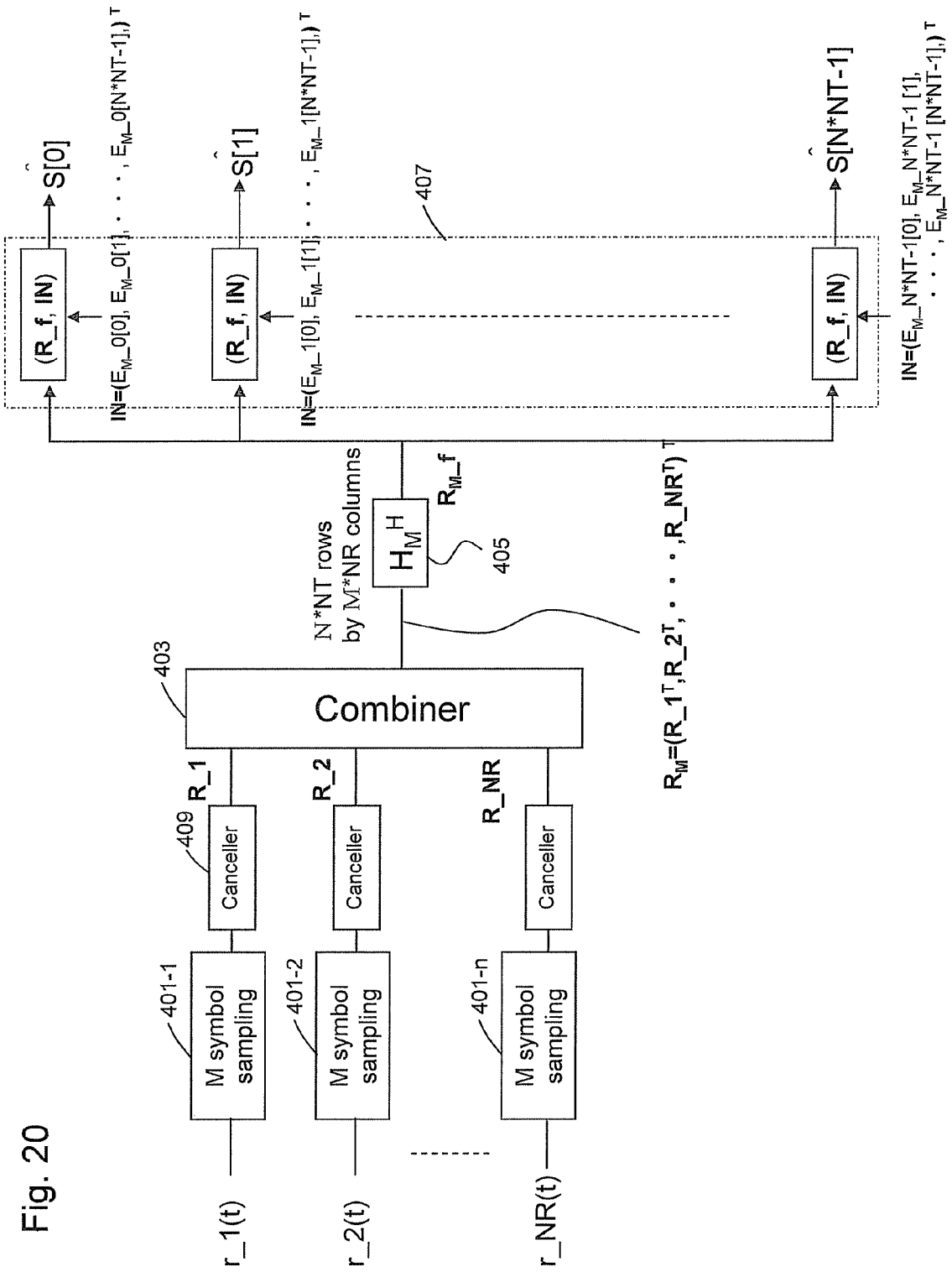
FIG. 20 is a diagram showing an internal configuration of the demodulation processing unit 40 shown in FIG. 13 if a canceller is included in the demodulation processing unit 40.
Figure 21:
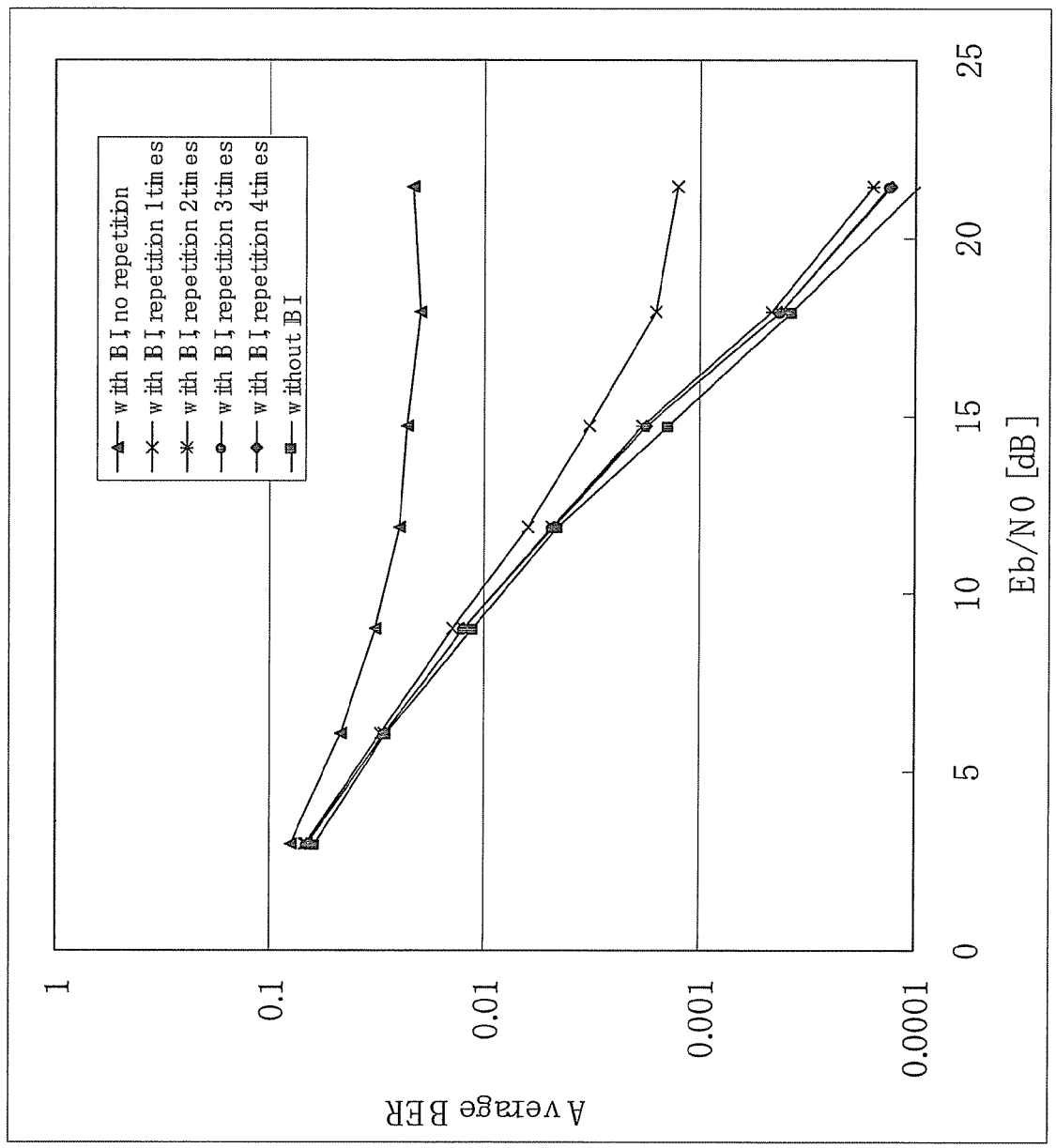
FIG. 21 is a diagram showing a result of examining a mean bit error rate relative to an energy-to-noise power density ratio (Eb/N0) per bit by changing repeat counts if the code division multiplexing transmission according to the present invention is combined with an interference canceller.
Figure 22:
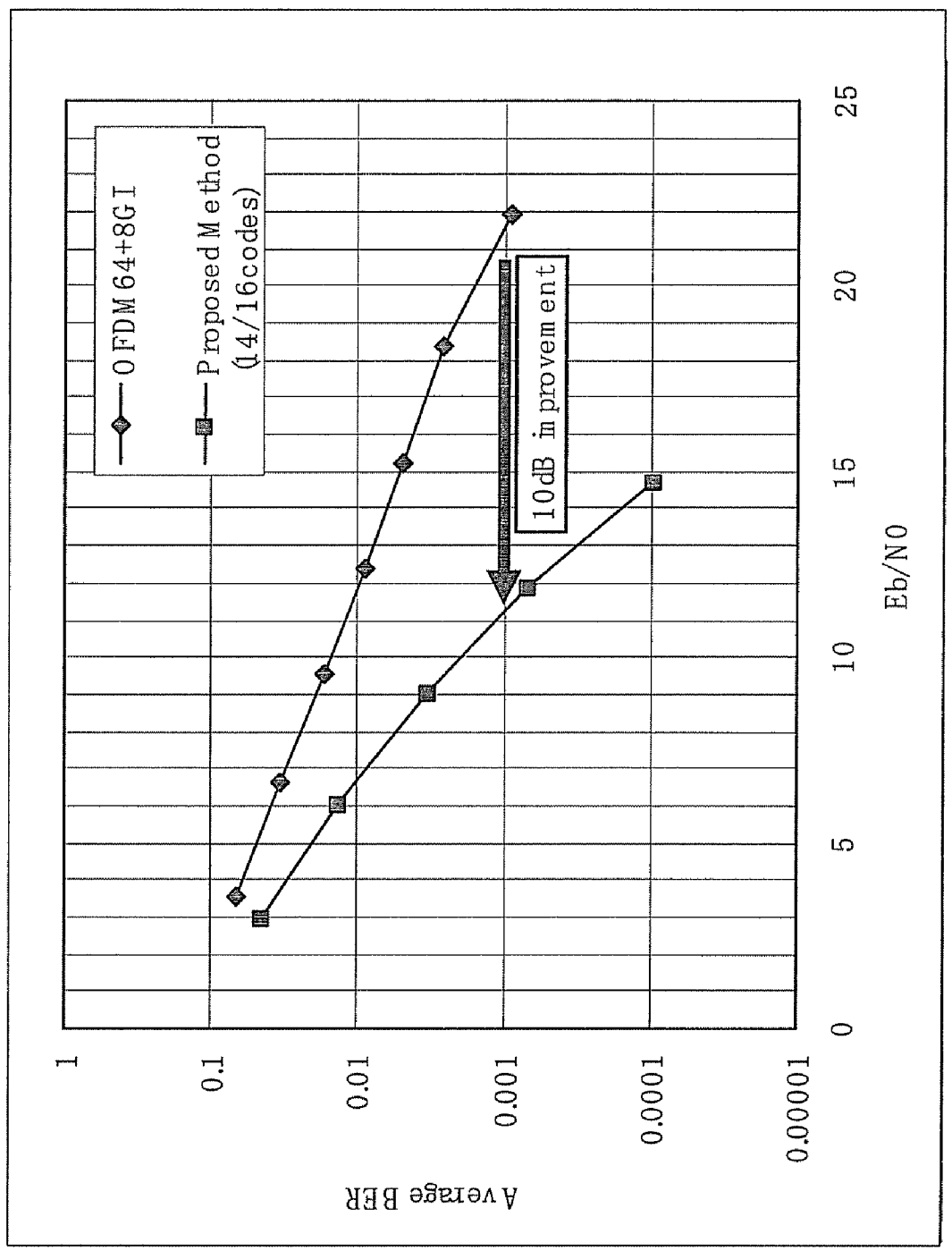
FIG. 22 is a diagram showing a mean bit error relative to the energy-to-noise power density (Eb/N0) per bit if the code division multiplexing transmission according to the present invention is performed.
Figure 23:
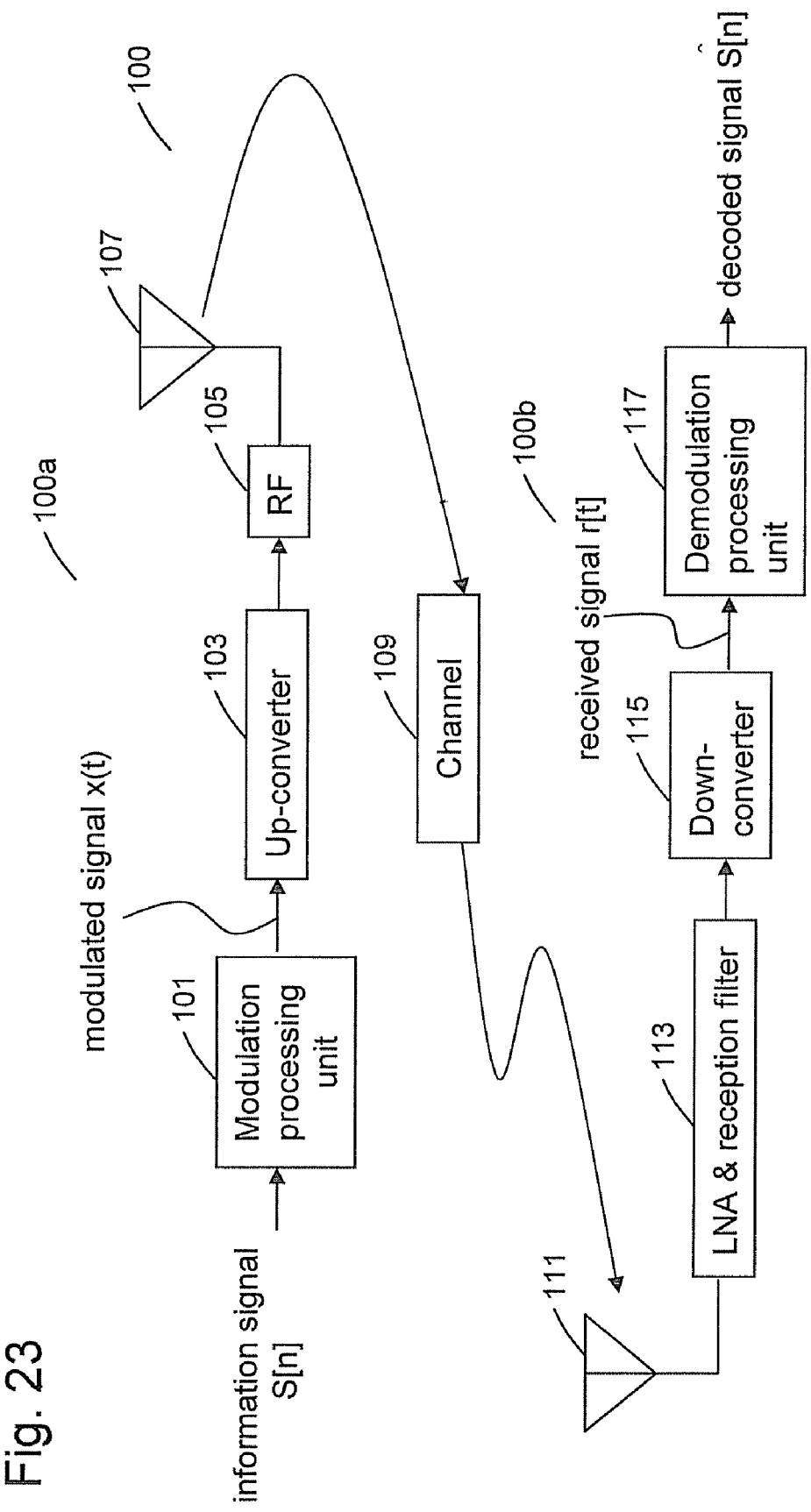
FIG. 23 is a diagram showing appearance of an ordinary code division multiplexing transmission system.
Figure 24:
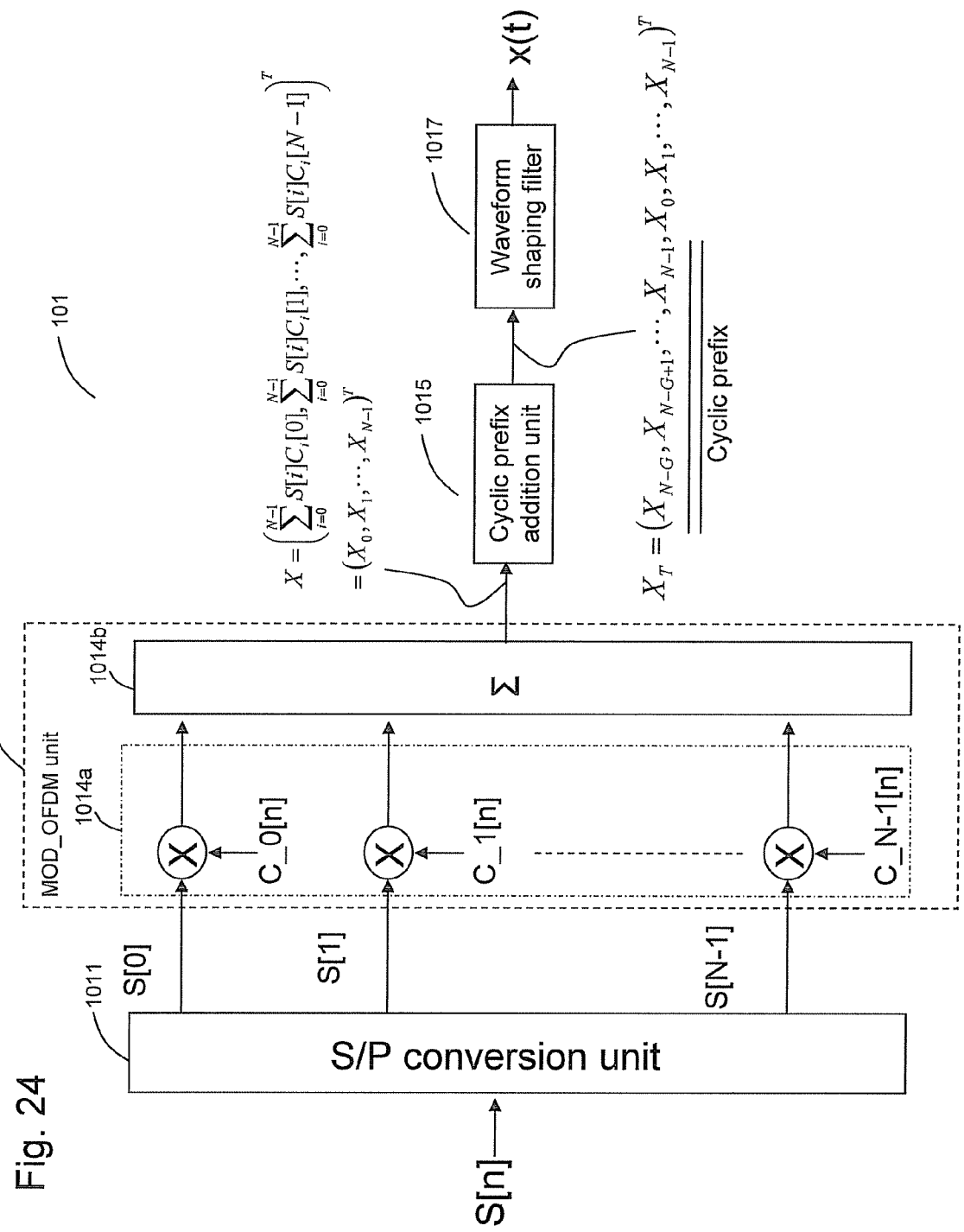
FIG. 24 is a diagram showing a configuration of a modulation processing unit 117 shown in FIG. 23 if OFDM serving as a conventional technique is applied to the modulation processing unit 117.
Figure 25:
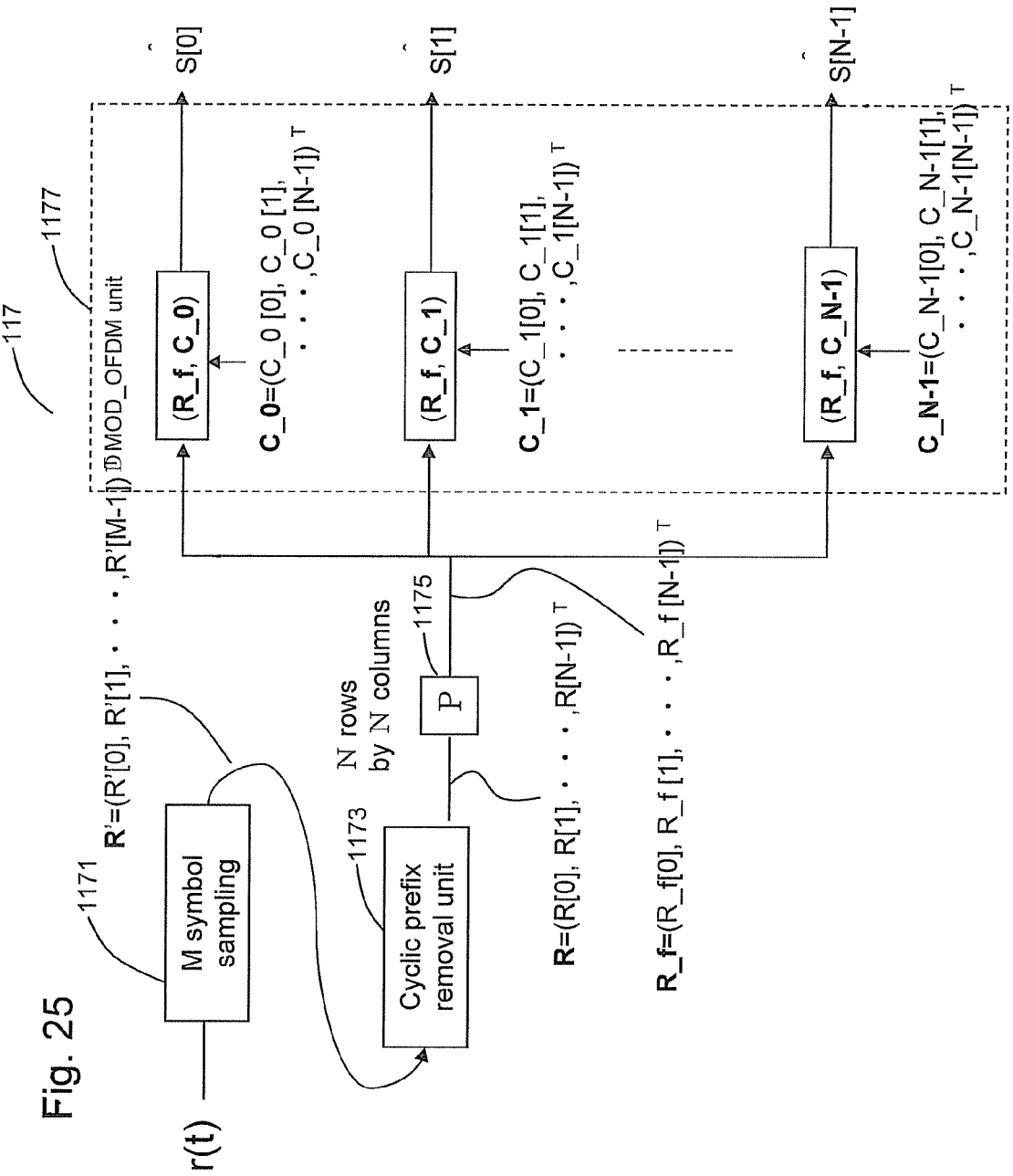
FIG. 25 is a diagram showing a configuration of a modulation processing unit 101 shown in FIG. 23 if OFDM serving as a conventional technique is applied to the modulation processing unit 101.

FIG. 1
11 S/P conversion unit
17 Waveform shaping filter
FIG. 3
1 Circular convolution operation
2 K symbol FIG. 5
21 M symbol sampling
1 N rows by M columns
FIG. 6
1 Interference tail
2 M symbol sampling
3 N rows by M columns
4 N symbol
FIG. 7
1 Interference tail
2 M symbol sampling
3 M symbol sampling
4 M symbol sampling
FIG. 10
21 M symbol sampling
29 Canceller
1 N rows by M columns
FIG. 11
1 Canceller
29a Reception unit
29b Re-decoding unit
29c Control unit
29d Block buffer (received modulation and decoding)
FIG. 12
ST1 Received?
ST2 Perform decoding processing on new modulation block
ST3 Make initial setting of to-be-re-decoded modulation block
ST4 Perform re-decoding processing on to-be-re-decoded modulation block
ST5 Update to-be-re-decoded modulation block to second latest modulation block
ST6 Predetermined number of times?
FIG. 13
1 modulation signal X_1(t)
2 information signal S[n]
31 modulation processing unit
3 modulated signal X_2(t)
4 modulated signal X_NT(t)
33-1 up-converter
41 channel
37-1 LNA&reception filter
39-1 down-converter
5 received signal r_1[t]
6 received signal r_2[t]
40 demodulation processing unit
7 decoded signal Sˆ[n]
8 received signal r_NR[t]
FIG. 14
1 Channel
FIG. 16
311 S/P conversion unit
317-1 Waveform shaping filter
FIG. 17
401-1 M symbol sampling
1 N*NT rows by M*NR columns
FIG. 19
1 Time block code setting mode
2 Data transmission mode
3 Propagation delay time
4 Leader
5 Data (transmit)
6 Pilot signal (transmit)
7 Follower
8 Data (receive)
9 Pilot signal (receive)
10 Processing time
11 Extension
12 Guard interval
FIG. 20
401-1 M symbol sampling
409 Canceller
1 N*NT rows by M*NR columns
FIG. 22
Characteristic comparison of proposed method with OFDM method.
Band consumption rate is assumed to be constant.
FIG. 23
1 Modulated signal X(t)
2 Information signal S[n]
101 Modulation processing unit
103 Up-converter
109 Channel
113 LNA&reception filter
115 Down-converter
3 Received signal r[t]
117 Demodulation processing unit
4 Decoded signal Sˆ[n]
FIG. 24
1011 S/P conversion unit
1013 MOD_OFDM unit
1015 Cyclic prefix addition unit
1017 Waveform shaping filter
1 Cyclic prefix
FIG. 25
1171 M symbol sampling
1173 Cyclic prefix removal unit
1 N rows by N columns

What is claimed is:

1. A transmission system comprising:
a transmitter device transmitting an information signal multiplied by a code, the code being a time block code constituted by a plurality of time series symbols, the transmitter device multiplying the information signal by a plurality of the time block codes, respectively, multiplexing multiplication results on a time axis and transmitting multiplexed signals; and
a receiver device including a reception filter,
wherein if an impulse response matrix of a channel is a matrix H, a characteristic of the reception filter is set to be represented by a complex conjugate transpose matrix $H^H$ to the matrix H and each of the time block codes is set by an eigen code represented by an eigen vector of a matrix $H^H H$ representing a coupled system in which the channel is coupled to the reception filter,
the receiver device includes a received modulation block buffer recording a received modulation block signal; and a decoded block buffer recording a decoding result of each of received modulation block signals, and
a processor to perform:
a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block;

a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block; and a third step of repeating the second step by a desired number of times is executed as a decoding processing.

2. The transmission system according to claim 1, wherein if the eigen vector is $E_k$ (where k represents a $k^{th}$), an eigen value corresponding to each eigen vector is $\lambda_k$ and constant is $\alpha$, the eigen vector $E_k$ is changed to an eigen vector obtained by multiplying the eigen vector $E_k$ by a square root of a weight coefficient $w_k$ proportional to the $\lambda_k^{-\alpha}$.

3. The transmission system according to claim 1, wherein if the eigen vector is $E_k$ (where k represents a $k^{th}$), an eigen value corresponding to each eigen vector is $\lambda_k$ and constant is TE, an eigen vector $E_k$ satisfying $1/\lambda_k >$ TE is not used in transmission of the information signal.

4. The transmitter device according to claim 1, wherein each of the time block codes is set by the eigen code.

5. The receiver device according to claim 1, comprising the reception filter a characteristic of which is set by the complex conjugate transpose matrix $H^H$.

6. A transmission method using a transmitter device transmitting an information signal multiplied by a code and a receiver device including a reception filter, wherein if an impulse response matrix of a channel is a matrix H, then a characteristic of the reception filter is set to be represented by a complex conjugate transpose matrix $H^H$ to the matrix H, a matrix $H^H H$ representing a coupled system in which the channel is coupled to the reception filter is an Hermitian symmetric matrix and the code is a code corresponding to an eigen vector of the matrix $H^H H$, the receiver device includes a received modulation block buffer recording a received modulation block signal; and a decoded block buffer recording a decoding result of each of received modulation block signals, and the method comprising:

a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block;

a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block; and a third step of repeating the second step by a desired number of times is executed as a decoding processing.

7. A transmission system comprising:

a transmitter device transmitting an information signal multiplied by a code, the information signal being transmitted on a channel using a plurality of transmit antennas and received from the channel using a plurality of reception antennas, the code being a time block code constituted by a plurality of time series symbols, the transmitter device multiplying the information signal by a plurality of the time block codes, respectively, multiplexing multiplication results on a time axis and transmitting multiplexed signals; and a receiver device including a reception filter, wherein if an impulse response matrix $H_M$ of the channel is defined by a formula with an impulse response matrix $H_{ij}$ where i is to discriminate the transmit antennas from one another and j is to discriminate the reception antennas from one another in a combination between each of the transmit antennas and each of the reception antennas, a characteristic of the reception filter is set to be represented by a complex conjugate transpose matrix $H_M^H$ to the matrix $H_M$ and each of the time block codes is set by an eigen code represented by an eigen vector of a matrix $H_M^H H_M$ representing a coupled system in which the channel is coupled to the reception filter, and the receiver device includes received modulation block buffer of each of the plurality of reception antenna recording each modulation block received by the plurality of reception antennas in parallel, respectively, and provided to correspond to the reception antennas, respectively, combining means for arranging the modulation blocks in an appropriate order and combining the modulation blocks, and a decoded block buffer recording a decoding result of a combined modulation block combined by the combining means;

reception means for, when receiving a new modulation block A_i (where i indicates an antenna number), reading a latest decoding result of a modulation block B_i received just before the modulation block A_i from the decoded block buffer, re-modulating the read latest decoding result and filtering the read latest decoding result to correspond to the channel, thereby obtaining a prefix interference component for each A_i, eliminating the prefix interference component from the modulation block A_i, combining, by the combining means, each A_i from which the prefix interference component is eliminated to generate a combined modulation block, storing a decoding result of decoding the combined modulation block in the decoded block buffer, and setting each of a second latest modulation block among modulation blocks in the received modulation block buffer to correspond to each of the reception antennas as each to-be-re-decoded modulation block;

re-decoding means for reading a latest decoding result of a modulation block received just before the each to-be-re-decoded modulation block from the decoded block buffer, re-modulating the read latest decoding result of the each to-be-re-decoded modulation block and filtering the read latest decoding result of the each to-be-re-decoded modulation block to correspond to the channel, thereby obtaining a prefix interference component to correspond to the each to-be-re-decoded modulation block, reading a latest decoding result of a modulation block received just after the to-be-re-decoded modulation block from the decoded block buffer, re-modulating the read latest decoding result of the to-be-re-decoded modulation block and filtering the read latest decoding result of the to-be-re-decoded modulation block to correspond to the channel, thereby obtaining a postfix interference component to correspond to the each to-be-re-decoded modulation block, eliminating the prefix interference component and the postfix interference component from the each to-be-re-decoded modulation block, combining, by the combining means, the each to-be-re-decoded modulation block from which the prefix interference component and the postfix interference component are eliminated to generate a combined modulation block, storing a decoding result of decoding the combined modulation block in the decoded block buffer, and setting each modulation block received just before the to-be-re-decoded modulation block in the received modulation block buffer to correspond to each of the reception antennas as a new to-be-re-decoded modulation block; and control means for controlling the re-decoding means to repeatedly perform a processing by a desired number of times, wherein $$H_M = \begin{pmatrix} \boxed{H_{11}} & \boxed{H_{21}} & \cdots & \boxed{H_{NT1}} \\ \boxed{H_{12}} & \boxed{H_{22}} & \cdots & \boxed{H_{NT2}} \\ \vdots & \vdots & & \vdots \\ \boxed{H_{1NR}} & \boxed{H_{2NR}} & \cdots & \boxed{H_{NTNR}} \end{pmatrix}.$$

8. The transmitter device according to claim 7, comprising a plurality of transmit antennas, a time block code being set by the eigen code, wherein an information signal is multiplied by the time block code, a multiplication result is allocated to each of the transmit antennas, and resultant signals are transmitted in parallel.

9. The receiver device according to claim 7, comprising a plurality of reception antennas; and the reception filter having a characteristic of which is set by the complex conjugate transpose matrix $H_M^H$, wherein signals received in parallel by the plurality of antennas are arranged in an appropriate order and combined.

10. A decoding method for a transmission system including a transmitter device transmitting an information signal multiplied by a code, the code being a time block code constituted by a plurality of time series symbols, the transmitter device multiplying the information signal by a plurality of the time block codes, respectively, multiplexing multiplication results on a time axis and transmitting multiplexed signals; and a receiver device including a reception filter, wherein if an impulse response matrix of a channel is a matrix H, a characteristic of the reception filter is set to be represented by a complex conjugate transpose matrix $H^H$ to the matrix H and each of the time block codes is set by an eigen code represented by an eigen vector of a matrix $H^H H$ representing a coupled system in which the channel is coupled to the reception filter, the receiver device includes a received modulation block buffer recording a received modulation block signal; and a decoded block buffer recording a decoding result of each of received modulation block signals, and the decoding method comprising:

a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block;

a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block; and a third step of repeating the second step by a desired number of times.

11. A decoding method for a transmission system including a transmitter device transmitting an information signal multiplied by a code, the code being a time block code constituted by a plurality of time series symbols, the transmitter device multiplying the information signal by a plurality of the time block codes, respectively, multiplexing multiplication results on a time axis and transmitting multiplexed signals; and a receiver device receiving a transmitted signal, wherein the receiver device includes a received modulation block buffer recording a received modulation block signal; and a decoded block buffer recording a decoding result of each of received modulation block signals, and the decoding method comprising:

a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block;

a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block; and a third step of repeating the second step by a desired number of times.

12. A decoder included in a receiver device in a transmission system including a transmitter device transmitting an information signal multiplied by a code, the code being a time block code constituted by a plurality of time series symbols, the transmitter device multiplying the information signal by a plurality of the time block codes, respectively, multiplexing multiplication results on a time axis and transmitting multiplexed signals, and a receiver device receiving a transmitted signal, wherein the decoder includes a received modulation block buffer recording a received modulation block signal; and a decoded block buffer recording a decoding result of each of received modulation block signals, and a processor to perform:

a first step of, when receiving a new modulation block A, storing the modulation block A in the received modulation block buffer, re-modulating a latest decoding result of a modulation block B recorded in the decoded block buffer and received just before the modulation block A and filtering the latest decoding result of the modulation block B to correspond to the channel, thereby obtaining a prefix interference component received by the modulation block A from the modulation block B, decoding the modulation block A after eliminating the prefix interference component from the modulation block A and storing a decoding result in the decoded block buffer, and setting a second latest modulation block among modulation blocks in the received modulation block buffer as a to-be-re-decoded modulation block;

a second step of reading a latest decoding result of a modulation block received just before the to-be-re-decoded modulation block from the decoded block buffer, re-modulating the read latest decoding result and filtering the read latest decoding result to correspond to the channel, thereby obtaining a prefix interference component, reading a latest decoding result of a modulation block received just after the to-be-re-decoded modulation block from the decoded block buffer, re-modulating the read latest decoding result and filtering the read latest recoding result to correspond to the channel, thereby obtaining a postfix interference component, decoding the to-be-re-decoded modulation block after eliminating the prefix interference component and the postfix interference component from the to-be-re-decoded modulation block and storing a decoding result in the decoded block buffer, and setting a modulation block stored in the received modulation block buffer and received just before the to-be-re-decoded modulation block as a new to-be-re-decoded modulation block; and a third step of repeating the second step by a desired number of times is executed as a decoding processing.

13. A receiver device in a transmission system including a transmitter device transmitting an information signal multiplied by a code, the information signal being transmitted on a channel using a plurality of transmit antennas and received from the channel using a plurality of reception antennas, the code being a time block code constituted by a plurality of time series symbols, the transmitter device multiplying the information signal by a plurality of the time block codes, respectively, multiplexing multiplication results on a time axis and transmitting multiplexed signals; and a receiver device including a reception filter, wherein if an impulse response matrix $H_M$ of the channel is defined by a formula with an impulse response matrix $H_{ij}$ where i is to discriminate the transmit antennas from one another and j is to discriminate the reception antennas from one another in a combination between each of the transmit antennas and each of the reception antennas, a characteristic of the reception filter is set to be represented by a complex conjugate transpose matrix $H_M^H$ to the matrix $H_M$ and each of the time block codes is set by an eigen code represented by an eigen vector of a matrix $H_M^H H_M$ representing a coupled system in which the channel is coupled to the reception filter, and the receiver device includes received modulation block buffer of each of the plurality of reception antenna recording each modulation block received by the plurality of reception antennas in parallel, respectively, and provided to correspond to the reception antennas, respectively, combining means for arranging the modulation blocks in an appropriate order and combining the modulation blocks, and a decoded block buffer recording a decoding result of a combined modulation block combined by the combining means;

reception means for, when receiving a new modulation block A_i (where i indicates an antenna number), reading a latest decoding result of a modulation block B_i received just before the modulation block A_i from the decoded block buffer, re-modulating the read latest decoding result and filtering the read latest decoding result to correspond to the channel, thereby obtaining a prefix interference component for each A_i, eliminating the prefix interference component from the modulation block A_i, combining, by the combining means, each A_i from which the prefix interference component is eliminated to generate a combined modulation block, storing a decoding result of decoding the combined modulation block in the decoded block buffer, and setting each of a second latest modulation block among modulation blocks in the received modulation block buffer to correspond to each of the reception antennas as each to-be-re-decoded modulation block;

re-decoding means for reading a latest decoding result of a modulation block received just before the each to-be-re-decoded modulation block from the decoded block buffer, re-modulating the read latest decoding result of the each to-be-re-decoded modulation block and filtering the read latest decoding result of the each to-be-re-decoded modulation block to correspond to the channel, thereby obtaining a prefix interference component to correspond to the each to-be-re-decoded modulation block, reading a latest decoding result of a modulation block received just after the to-be-re-decoded modulation block from the decoded block buffer, re-modulating the read latest decoding result of the to-be-re-decoded modulation block and filtering the read latest decoding result of the to-be-re-decoded modulation block to correspond to the channel, thereby obtaining a postfix interference component to correspond to the each to-be-re-decoded modulation block, eliminating the prefix interference component and the postfix interference component from the each to-be-re-decoded modulation block, combining, by the combining means, the each to-be-re-decoded modulation block from which the prefix interference component and the postfix interference component are eliminated to generate a combined modulation block, storing a decoding result of decoding the combined modulation block in the decoded block buffer, and setting each modulation block received just before the to-be-re-decoded modulation block in the received modulation block buffer to correspond to each of the reception antennas as a new to-be-re-decoded modulation block; and control means for controlling the re-decoding means to repeatedly perform a processing by a desired number of times, wherein $$H_M = \begin{pmatrix} \boxed{H_{11}} & \boxed{H_{21}} & \cdots & \boxed{H_{NT1}} \\ \boxed{H_{12}} & \boxed{H_{22}} & \cdots & \boxed{H_{NT2}} \\ \vdots & \vdots & & \vdots \\ \boxed{H_{1NR}} & \boxed{H_{2NR}} & \cdots & \boxed{H_{NT NR}} \end{pmatrix}.$$

* * * * *